(12) United States Patent
Loh et al.

(10) Patent No.: US 10,720,072 B2
(45) Date of Patent: Jul. 21, 2020

(54) ADAPTIVE LEARNING SYSTEM USING AUTOMATICALLY-RATED PROBLEMS AND PUPILS

(71) Applicant: Expii, Inc., Pittsburgh, PA (US)

(72) Inventors: Po-Shen Loh, Pittsburgh, PA (US); Linus Ulysses Hamilton, Hyattsville, MD (US); Ray Yu Li, Sewickley, PA (US)

(73) Assignee: Expii, Inc., Pittsburgh, PA (US)

( * ) Notice: Subject to any disclaimer, the term of this patent is extended or adjusted under 35 U.S.C. 154(b) by 363 days.

(21) Appl. No.: 15/435,930

(22) Filed: Feb. 17, 2017

(65) Prior Publication Data

US 2017/0243502 A1 Aug. 24, 2017

Related U.S. Application Data

(60) Provisional application No. 62/297,238, filed on Feb. 19, 2016.

(51) Int. Cl.
*G09B 7/04* (2006.01)
*G09B 7/00* (2006.01)
(Continued)

(52) U.S. Cl.
CPC .......... *G09B 7/04* (2013.01); *G09B 7/00* (2013.01); *G09B 7/02* (2013.01); *G09B 17/003* (2013.01)

(58) Field of Classification Search
CPC ... G09B 7/00; G09B 7/02; G09B 7/06; G06Q 50/2057; G06Q 50/2053; G06Q 50/205
See application file for complete search history.

(56) References Cited

U.S. PATENT DOCUMENTS

| | | | | |
|---|---|---|---|---|
| 5,820,386 A | * | 10/1998 | Sheppard, II | .......... G09B 5/065 434/322 |
| 6,029,156 A | * | 2/2000 | Lannert | .................... G09B 7/04 706/11 |

(Continued)

OTHER PUBLICATIONS

Brilliant.org [online], Geometric Measurement: Geometry Warmups Level 2, https://brilliant.org/practice/geometry-warmups-level-2-challenges/?subtopic=geometric-measurement&chapter=fur . . . , available on or before Feb. 11, 2016, 1 page.

(Continued)

*Primary Examiner* — Robert J Utama
(74) *Attorney, Agent, or Firm* — Fish & Richardson P.C.

(57) ABSTRACT

Implementations for adaptive learning include actions of: outputting a practice problem having a problem difficulty rating, in which the practice problem is identified by one or more concept tags, each concept tag relating to a different subject-matter area that forms a basis of the practice problem; receiving an answer from a user to the practice problem; responsive to receiving the answer, determining whether the answer includes a correct or incorrect response to the practice problem; responsive to determining whether the answer includes a correct or incorrect response, updating, for each of the different subject-matter areas, a corresponding user specific comprehension rating and the problem difficulty rating of the practice problem, based on whether the answer includes a correct or incorrect response; and outputting, for at least one of the different subject areas that forms the basis of the practice problem, the updated user specific comprehension rating.

30 Claims, 8 Drawing Sheets

(51) Int. Cl.
  *G09B 7/02* (2006.01)
  *G09B 17/00* (2006.01)

(56) References Cited

U.S. PATENT DOCUMENTS

| | | | | |
|---|---|---|---|---|
| 6,032,141 | A * | 2/2000 | O'Connor | G09B 7/04 434/107 |
| 6,493,690 | B2 * | 12/2002 | Bertrand | G06F 9/453 706/45 |
| 8,052,426 | B2 * | 11/2011 | Snyder | G06Q 10/06311 434/365 |
| 8,699,941 | B1 * | 4/2014 | Holt | G09B 7/02 434/362 |
| 2001/0041330 | A1 * | 11/2001 | Brown | G09B 7/02 434/332 |
| 2002/0142278 | A1 * | 10/2002 | Whitehurst | G09B 7/04 434/350 |
| 2003/0023686 | A1 * | 1/2003 | Beams | G09B 5/14 709/205 |
| 2003/0059750 | A1 * | 3/2003 | Bindler | G06Q 10/10 434/236 |
| 2003/0077559 | A1 * | 4/2003 | Braunberger | G09B 7/00 434/322 |
| 2005/0277099 | A1 * | 12/2005 | Van Schaack | G09B 5/00 434/322 |
| 2007/0020604 | A1 * | 1/2007 | Chulet | G09B 5/06 434/350 |
| 2007/0141540 | A1 * | 6/2007 | Borg | G06Q 30/02 434/127 |
| 2007/0172808 | A1 * | 7/2007 | Capone | G09B 7/00 434/350 |
| 2007/0255805 | A1 * | 11/2007 | Beams | G09B 7/00 709/218 |
| 2008/0261191 | A1 * | 10/2008 | Woolf | G06Q 50/20 434/323 |
| 2009/0047648 | A1 * | 2/2009 | Ferreira | G09B 7/08 434/323 |
| 2009/0176198 | A1 * | 7/2009 | Fife | G09B 7/02 434/353 |
| 2012/0329027 | A1 * | 12/2012 | Lewolt | G06Q 10/101 434/322 |
| 2013/0004930 | A1 * | 1/2013 | Sorenson | G09B 7/02 434/350 |
| 2013/0017530 | A1 * | 1/2013 | Nguyen | G09B 7/02 434/362 |
| 2014/0065590 | A1 * | 3/2014 | Kim | G09B 7/02 434/322 |
| 2014/0106331 | A1 * | 4/2014 | Mitalski | G09B 5/08 434/350 |
| 2014/0255889 | A1 * | 9/2014 | Grimes | G09B 19/00 434/236 |
| 2014/0272908 | A1 * | 9/2014 | Black | G09B 5/08 434/362 |
| 2014/0272914 | A1 * | 9/2014 | Baraniuk | G06N 20/00 434/362 |
| 2014/0349259 | A1 * | 11/2014 | Ingrassia, Jr. | G09B 17/003 434/169 |
| 2017/0092145 | A1 * | 3/2017 | Lin | G09B 7/02 |

OTHER PUBLICATIONS

Brilliant.org [online], Geometric Measurement: Geometry Warmups Level 1, https://brilliant.org/practice/geometry-warmups-level-1-challenges/?p=4, Feb. 11, 2016, 1 page.

Brilliant.org [online] You leveled up!, https://brilliant.org/practice/simplifying-expressions-level-2-3-challenges/?p=5, Feb. 11, 2016, 1 page.

Brilliant.org [online] Algebraic Expressions, Simplifying Expressions, https://brilliant.org/practice/simplifying-expressions-level-2-3-challenges/?p=4, Feb. 11, 2016, 1 page.

Brilliant.org [online] Algebraic Expressions: Simplifying Expressions, Expressions with Exponents, https://brilliant.org/practice/simplify-exponents/?p=3, Feb. 11, 2016, 1 page.

Brilliant.org [online] Algebra, Continue practicing, Level?, Percentile Rank $59^{th}$, https://brilliant.org/profile/po-shen-st16b8/stats/algebra/, Feb. 11, 2016, 1 page.

Brilliant.org [online] Algebraic Expressions, Simplifying Expressions, Expressions with Exponents, https://brilliant.org/practice/simplify-exponents/?p=4, Feb. 11, 2016, 1 page.

Brilliant.org [online] Geometric Measurement: Geometry Warmps Level 1, https://brilliant.org/practice/geometry-warmups-level-1-challenges/?p=2 Feb. 11, 2016, 1 page.

Brilliant.org [online] Geometry Continue Practicing: Level 1, Percentile Rank $92^{nd}$, https://brilliant.org/profile/po-shen-st16b8/stats/geometry/, Feb. 11, 2016, 1 page.

Brilliant.org [online] Advanced Polynomials: Algebraic Manipulation, Level 1, https://brilliant.org/practice/algebraic-manipulation-level-1-challenges/?p=2, Feb. 11, 2016, 1 page.

Brilliant.org [online] Advanced Polynomials: Algebraic Manipulation, Level 1, https://brilliant.org/practice/algebraic/manipulation-level-1-challenges/?p=3 , Feb. 11, 2016, 1 page.

Brilliant.org [online], Quiz cleared Level 1, Next quiz: Level 2, https://brilliant.org/practice/algebraic-manipulation-level-1-challenges/?p=5, Feb. 11, 2016, 1 page.

Brilliant.org [online], Algebra: Algebraic Manipulation, https://brilliant.org/math/algebra/advanced-polynomials/, Feb. 11, 2016, 1 page.

Brilliant.org [online], Quiz cleared Level 1, Next quiz: Level 2-3, https://brilliant.org/practice/solving-equations-level-1-challenges/?p=5, Feb. 11, 2016, 1 page.

Brilliant.org [online] Algebra Continue Practicing, Level 2, Percentile Rank $93^{rd}$, https://brilliant.org/profile/po-shen-st16b8/stats/algebra/, Feb. 11, 2016, 1 page.

Brilliant.org [online] Quiz cleared! Types of Angles Next quiz: Finding Angle Measures, https://brilliant.org/practice/classification-of-angles/?p=5, Feb. 11, 2016, 1 page.

Brilliant.org [online] How do I change a level? https://brilliant.org/discussions/thread/how-do-i-change-level/, Feb. 11, 2016, 1 page.

Brilliant.org [online] https://brilliant.org/discussions/thread/points-2/, Feb. 11, 2016, 1 page.

Brilliant.org [online] Algebra Level 2 Percentile Rank $93^{rd}$, https://brilliant.org/profile/po-shen-st16b8/stats/algebra, Feb. 11, 2016, 1 page.

Brilliant.org [online] https://brilliant.org/discussions/thread/how-do-i-change-level/, Feb. 11, 2016, 1 page.

Brilliant.org [online] https://brilliant.org/profile/po-shen-st_16b8/stats/algebra/, Feb. 11, 2016, 1 page.

Brilliant.org [online] https://brilliant.org/practice/simplifying-expressions-level-2-3-challenges/?subtopic=algebraic-expressions &chapter, Feb. 11, 2016, 1 page.

Brilliant.org [online] Quiz cleared! Expressions with Exponents, https://brilliant.org/practice/simplify-exponents/?p=5, Feb. 11, 2016, 1 page.

Brilliant.org [online] Algebraic Expressions: Simplifying Expressions Level 2-3, https://brilliant.org/practice/simplifying-expressions-level-2-3-challenges/?p=2, Feb. 11, 2016, 1 page.

Brilliant.org [online] Algebraic Expressions: Solving Equations, Level 1, https://brilliant.org/practice/solving-equations-level-1-challenges/?p =3, Feb. 11, 2016 1 page.

Brilliant.org [online] https://brilliant.org/profile/po-shen16b8/stats/algebra/, Feb. 11, 2016 1 page.

Brilliant.org [online] Algebraic Expressions, Simplifying Expressions, Level 2-3, https://brilliant.org/practice/simplifying-expressions-level-2-3-challenges/?p=3, Feb. 11, 2016 1 page.

Brilliant.org [online] Algebraic Expressions, Solving Equation, Level 1, https://brilliant.org/practice/solving-equations-level-1-challenges/?p=4 Feb. 11, 2016 1 page.

Brilliant.org [online] Points and Ratings, https://brilliant.org/discussions/thread/points-2/, Feb. 11, 2016 1 page.

Brilliant.org [online] Test Prep on Brilliant, https://brilliant.org/help/, Feb. 11, 2016 1 page.

Brilliant.org [online] https://brilliant.org/help/, Feb. 11, 2016 1 page.

(56) References Cited

OTHER PUBLICATIONS

Brilliant.org [online] About Brilliant, https://brilliant.org/help/, Feb. 11, 2016 1 page.
Brilliant.org [online] Levels and Ratings on Brilliant, https://brilliant.org/levels, Feb. 11, 2016 1 page.
Brilliant.org [online] Levels and Ratings on Brilliant, https://problems/lets-check-have-much-you-know/?group=UFxRvozONKhs#!/solution-comments/12872, Feb. 11, 2016 1 page.
Brilliant.org [online] Let's check how much you know, https://brilliant.org/problems/lets-check-have-much-you-know/?group=uFxRvozONKhs#!/solution-comments/12872, Feb. 11, 2016 1 page.
Brilliant.org [online] Solving Problems on Brilliant, https://brilliant.org/help, Feb. 11, 2016 1 page.
Brilliant.org [online] Account Questions, https://brilliant.org/help, Feb. 11, 2016 1 page.
Brilliant.org [online] Algebra, Level1, Percentile Rank 24th, https://brilliant.org/profile/po-shen-st16b8/stats/algebra/, Feb. 11, 2016, 1 page.
Brilliant.org [online] Algebraic Expressions: Simplifying Expressions Level 2-3, https://brilliant.org/practice/simpliflying-expressions-level-2-3-challenges/?subtopic=algebraic-expressions&chapter=, Feb. 11, 2016, 1 page.
Brilliant.org [online] What makes my rating change?, https://help.brilliant.org/solving-problems-on-brilliant/what-makes-my-rating-change, Feb. 11, 2016, 1 page.
Groeneveld C.M. (2014) Implementation of an Adaptive Training and Tracking Game in Statistics Teaching. In: Kalz M., Ras E. (eds) Computer Assisted Assessment. Research into E-Assessment. CAA 2014. Communications in Computer and Information Science, vol. 439:53-58, Jun. 30-Jul. 1, 2014.

\* cited by examiner

ADAPTIVE LEARNING SYSTEM USING AUTOMATICALLY-RATED PROBLEMS AND PUPILS

CROSS-REFERENCE TO RELATED APPLICATIONS

This application claims the benefit of U.S. Provisional Patent Application No. 62/297,238, filed Feb. 19, 2016, which is incorporated herein by reference in its entirety.

BACKGROUND

The advent of the Internet has enabled online learning systems (also referred to as e-learning systems or tutoring systems), which implement educational technology in learning. In general, educational technology includes an array of tools, such as media, machines, and networking hardware, that enable users to access an online learning system as a pupil, and/or as an instructor. For example, a user can access the online learning system to learn about particular subjects (e.g., math, science). As another example, a user can access the online learning system to teach about a particular subject. For example, the user can submit content (e.g., text, images, video) that describes a solution to a math problem.

SUMMARY

Implementations of the present disclosure are directed to adaptive learning through automatic rating of problems and pupils. In some implementations, actions include: outputting, from one or more processors, a practice problem having a problem difficulty rating, in which the practice problem is identified by one or more concept tags, each concept tag relating to a different subject-matter area that forms a basis of the practice problem; receiving, by the one or more processors, an answer from a user to the practice problem; responsive to receiving the answer, determining whether the answer includes a correct or incorrect response to the practice problem; responsive to determining whether the answer includes a correct or incorrect response, updating, for each of the different subject-matter areas that forms a basis of the practice problem, a corresponding user specific comprehension rating and the problem difficulty rating of the practice problem, based on whether the answer includes a correct or incorrect response; and outputting, for at least one of the different subject-matter areas that forms the basis of the practice problem, the updated user specific comprehension rating.

In other implementations, actions include: receiving, over a network, from a client device, an identification by a user of at least one subject-matter area to learn; responsive to receiving the identification, identifying, by one or more processors, a potential practice problem having a problem difficulty rating within a predetermined range of at least one user specific comprehension rating for the user, wherein the practice problem is identified by one or more concept tags, each concept tag relating to a different subject-matter area that forms a basis of the practice problem; transmitting, from the one or more processors, the identified practice problem to the client device over the network; receiving, over the network, from the client device, an answer to the practice problem; responsive to receiving the answer, determining, by the one or more processors, whether the answer includes a correct or incorrect response to the practice problem; responsive to determining whether the answer includes a correct or incorrect response, updating, for each of the different subject-matter areas that forms a basis of the practice problem, a corresponding user specific comprehension rating and the problem difficulty rating of the practice problem, based on whether the answer includes a correct or incorrect response; and outputting, for at least one of the different subject-matter areas that forms the basis of the practice problem, the updated user specific comprehension rating. Other implementations of this aspect include corresponding systems, apparatus, and computer programs, configured to perform the actions of the methods, encoded on computer storage devices.

These and other implementations can each optionally include one or more of the following features. For example, in some implementations, the actions further include, prior to outputting the practice problem to the display, identifying a potential practice problem having a problem difficulty rating within a predetermined range of at least one user specific comprehension rating for a specified user; and selecting the identified potential practice problem as the practice problem to output to the display. Identifying the potential practice problem can include identifying a problem that the specified user has not previously attempted. Identifying the potential practice problem can include identifying a problem associated with at least one concept tag that corresponds to a subject-matter area selected by the specified user.

In some implementations, each user specific comprehension rating is unbounded, and each user specific comprehension rating is an indicator of the specified user's comprehension of the corresponding subject-matter area relative to the comprehension of the corresponding subject-matter area by one or more other users.

In some implementations, determining whether the answer includes a correct or incorrect response to the practice problem includes determining whether the answer includes a correct response on the user's first attempt to solve the problem. In some implementations, updating the corresponding user specific comprehension rating and updating the problem difficulty rating of the practice problem include determining whether the user previously attempted to solve more or less than a predetermined number of practice problems, each of which is associated with at least one of the one or more concept tags.

In some implementations, updating the corresponding user specific comprehension rating and updating the problem difficulty rating of the practice problem include determining whether the user previously attempted to solve more or less than the predetermined number of practice problems, each of which is associated with each of the one or more concept tags.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more advantages. For example, in some implementations, users of the interactive learning system are provided with a metric indicative of the user's knowledge of subject-matter that is not arbitrarily set or determined by a third party. In some implementations, a rating of how well the user comprehends certain subject-matter is automatically determined based on a user response to a practice problem immediately after the response is submitted, rather than based on a computationally resource intensive analysis of other users utilizing the learning system. In some implementations, the learning systems of the present disclosure enable learning and mastery of multiple different subject-matter areas at a time, by presenting users with practice problems that require knowledge and/or understanding of such multiple different subject-matter areas.

Additionally, the interactive learning system of the present disclosure can, in some implementations, provide a transparently understandable and precise measure of a user's ability to comprehend a vast array of specific topics relative to the general public for those same topics. Other learning systems may rely on predefined benchmarks to evaluate a user's comprehension ability. For instance, school curricular standards may be manually defined by professional committees, and students are measured for mastery of those standards that are extrinsic to the system. The extrinsically set standards tend to be fixed and can be difficult to update, making traditional student evaluation difficult to modernize.

With the presently disclosed system and techniques, standards are not set, but individuals are compared against the global population using a large set of practice problems. Thus, the practice problem set and each individual's performance serves as a proxy for evaluating a global population of students. While individual problems may have only a small influence on the overall evaluation, the collective effect is meaningful and resilient to random fluctuations caused by outlier problems.

Both user comprehension ratings and problem difficulty ratings are continuously updated through user interactions with practice problems. The practice problems themselves represent tasks of varying difficulty that a user can accomplish with varying levels of mastery. Instead of manually and arbitrarily defining levels of mastery, however, the presently disclosed systems and techniques allow for algorithmically-adjusted ratings to reflect the relative capability of one person at solving these problems against the general population. For instance, two users having identical comprehension ratings for a particular topic would have roughly similar ability to solve the same problems on that topic. On the other hand, if the two users have different ratings on a topic then, when presented with the same problem, the higher-rated person would have a higher likelihood of solving it. The algorithms for determining the user ratings may take into account whether the user correctly or incorrectly solved the practice problem, how long it took the user to solve and/or attempt the problem, how many times the user attempted the problem, among other inputs.

The presently disclosed systems and techniques enable a new way of approaching learning. In contrast to methods where a student works on problems at a predefined level or standard, resulting in a final evaluation based on that standard (e.g., a "B" student correctly answers 80% or more of the problems at the predefined level whereas an "A" student answers 90% or more of the problems), the presently disclosed systems and techniques enable students to match against problems that they succeed on with intermediate probabilities (say 40-70%), increasing problem difficulty as student ability develops. A student's rating on a topic then measures not how reliably the student can solve a problem at a fixed level set by an external body, but how difficult of a problem the student can solve. This mechanism makes it possible to distinguish talent at the upper tail of the distribution, which is difficult to evaluate using traditional methods of measurement.

A particular advantage of the system and techniques disclosed herein is that the ratings are very efficient to compute, transparently understandable to the user (through the presentation of real-time and automatically updated user-comprehension ratings), and self-correcting (e.g., if a problem has a problem-difficulty rating that drops below the problem's intrinsic difficulty, more users will soon incorrectly solve the problem, causing the problem's rating to increase). Even when the system employs millions of challenge problems and even larger numbers of users (e.g., hundreds of millions), the systems can be used to present automatically updated in real-time, user comprehension ratings and problem difficulty ratings.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

BRIEF DESCRIPTION OF THE DRAWINGS

Like reference symbols in the various drawings indicate like elements.

DETAILED DESCRIPTION

One issue with online learning systems is that, in some systems, a user is required to focus on learning one or more prerequisite subjects until an arbitrary and predefined level of mastery is achieved. Only once "mastery" of the subject has been obtained can the user move onto more difficult aspects of the subject or onto a next subject. Thus, the depth to which a user is understood to have "mastered" a subject is arbitrarily set and bounded by the online learning systems. In some cases, the systems rank the ability of users with respect to subject areas based on a comprehensive analysis of the performance of other users of the system. Such a comprehensive analysis can entail the use of significant resources to not only create thousands of practice problems, but also to perform a statistical analysis and evaluation of potentially thousands of users' responses to such problems, which can be a substantially computationally intensive process. Furthermore, such analysis often involves significant human labor (e.g., education researchers and curriculum designers) in addition to the algorithmic work and data science.

Implementations of the present disclosure are generally directed to an interactive learning system. More particularly, implementations of the present disclosure are directed to an interactive, online learning system, which displays per-concept ratings on a concept map, in which the ratings intrinsically signify how well the user comprehends the subject-matter relative to the general population of other users of the system. A rating also may intrinsically signify the probability of a user correctly answering a practice problem associated with a particular difficulty rating relative to one or more other users of the system. The ratings also may be unbounded such that users of the interactive learning system are provided with a metric indicative of the user's knowledge of subject-matter that is not arbitrarily set or determined by a third party. In some implementations, the evaluation of the user and the rating derivation are automatically determined by the interactive learning system based on a user response to the problem immediately after the response is submitted, rather than based on a computationally resource intensive analysis of other users utilizing the system. Furthermore, in some implementations, the learning systems of the present disclosure enable learning and mastery of multiple different subject-matter areas at a time, by presenting users with practice problems that require knowledge and/or understanding of such multiple different subject-matter areas.

Figure 1:
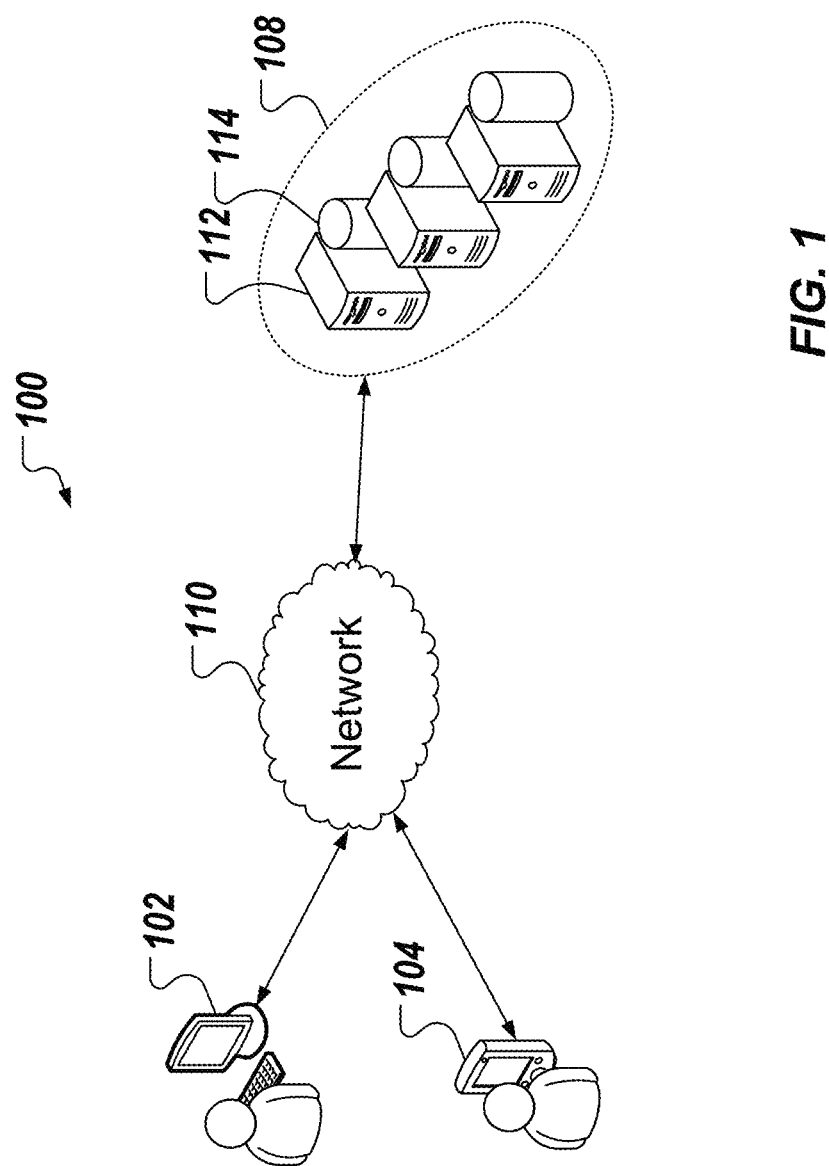
FIG. 1 depicts an example system architecture that can be used to realize implementations of the present disclosure.

FIG. 1 depicts an example system architecture 100 that can be used to realize implementations of the present disclosure. In the depicted example, the architecture 100 includes computing devices 102, 104 (e.g., client-side devices), server systems 108 (e.g., server-side systems), and a network 110. In some examples, the computing devices 102, 104 and the server systems 108 communicate over one or more networks (e.g., including the network 110). In some examples, the computing devices 102, 104 can each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the server systems 108 each include at least one server device 112 and at least one data store 114. In the example of FIG. 1, the server systems 108 are each intended to represent various forms of servers including, but not limited to a web server, an application server, a proxy server, a network server, and/or a server pool. In general, server systems accept requests for application services and provides such services to any number of client devices (e.g., the computing devices 102, 104) over the network 110. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In accordance with implementations of the present disclosure, the server systems 108 can (individually, or collectively) host an online learning system. More particularly, the server systems 108 can host an interactive, online learning system, described in further detail herein. Alternatively, in some implementations, the computing devices 102, 104 store executable interactive learning software (also referred to as "application software") that can transmit and/or receive data from the server systems 108. As an example, in implementations where the systems 108 host an online learning system, users of the computing devices 102, 104 can access the interactive online learning system through one or more interactive webpages hosted by the server systems 108. The one or more interactive webpages may provide educational information related to one or more subject-matter areas with which the users are interested. The one or more interactive webpages also may provide multiple different interactive practice problems related to the different subject-matter areas, from which the users can select and attempt to answer in an effort to test and apply their knowledge. Upon receiving the answers to the practice problems, the online learning system can determine whether the users have answered the problems correctly and provide feedback to the users. Additionally, the online learning system can provide the users with one or more ratings indicative of how well the users comprehend the subject-matter areas associated with the practice problems.

As another example, in implementations where the computing devices 102, 104 store executable interactive learning software, users of the computing devices 102, 104 can access the application software through the devices 102, 104, rather than through webpages, to read the educational information and/or to access and attempt practice problems. Upon answering the practice problems, the answers may be transmitted over the network 110 to the server systems 108 for analysis. Based on the analysis, the server systems 108 can also transmit, over network 110 and to the computing devices 102, 104, users with one or more ratings indicative of how well the users comprehend the subject-matter areas associated with the practice problems. Alternatively, the answers may be analyzed on the computing device (e.g., 102 or 104). Similarly, the computing devices 102, 104 can determine ratings indicative of how well the users comprehend the subject-matter areas associated with the practice problems based on the analysis.

As introduced above, implementations of the present disclosure are directed to an interactive, learning system. More particularly, implementations of the present disclosure are directed to an interactive, online learning system, which displays, e.g., unbounded per-concept ratings on a concept map. In some implementations, ratings are determined based on user interactions with problems that are automatically rated at the same time. In some implementations, a rating or ratings are displayed as the user interacts with a problem.

In some implementations, the online learning system of the present disclosure includes a map of individual concepts in particular subject-matter areas (e.g., math, science, and engineering). For example, in math, example concepts can include concepts such as basic arithmetic, geometry, topology, algebra, calculus, combinatorics, probability and statistics, and number theory, among others. As another example, in science, example concepts include concepts such as life science, chemistry, earth science, computer science, and physics, among others. As another example, in engineering, example concepts can include concepts such as civil engineering, mechanical engineering, electrical engineering, computer engineering, and chemical engineering, among others. In some implementations, the map of concepts can include maps of sub-concepts concerning particular areas within one or more concepts. For instance, the sub-concepts can include topics such as the Pythagorean Theorem within the area of geometry or the "chain rule" for derivatives within the area of calculus. In some implementations, the online learning system includes practice problems (e.g., thousands of practice problems), where each practice problem is tagged with at least one concept and/or sub-concept. For example, a first practice problem in math can be tagged with the concepts geometry and calculus. As another example, a second practice problem in math can be tagged with the concepts combinatorics in math and genetics in biology.

In accordance with implementations of the present disclosure, each problem is assigned a rating (a "problem difficulty rating") indicative of how difficult the problem is to solve, and each user is assigned a numeric rating (a "user comprehension rating") for each of the individual concepts, in which the user comprehension rating is indicative of how well the user understands the corresponding concept. The ratings for both the user and a concept underlying the problem can be structured such that the difference between the ratings is indicative of the likelihood that a user will successfully solve the problem. For instance, for a user attempting to solve a problem in which both the user and the problem have the same rating value (e.g., 400), the probability that the user will correctly answer the problem is about 50%. In contrast, if the user has a rating value that is greater than the rating value associated with the problem (e.g., 600 versus 200), then the user is more likely to correctly answer the problem than not. Likewise, if the user has a rating value that is less than the rating value associated with the problem (e.g., 200 versus 600), then the user is unlikely to correctly answer the problem. The larger the gap is between the rating of the user and the problem rating, the greater (or smaller) is the probability that the user will correctly answer the problem. While the user comprehension ratings are specific to each user, they are also useful for comparison against other users of the system. That is, a first user may have a first user comprehension rating for the subject of calculus, whereas another user may have a second different user comprehension rating for the subject of calculus that is higher than the first user's comprehension rating (intrinsically indicating greater comprehension of calculus concepts relative to the first user) or lower than the first user's comprehension rating (indicating a lesser grasp of calculus concepts relative to the first user). The size of the gap between different users' ratings for a particular topic is indicative of how much more likely or less likely a first user will correctly solve a problem associated with that particular topic relative to the other user. Thus, as a first user's rating for a topic increases relative to a second user's rating for that same topic, the greater the probability, relative to the second user, that the first user will correctly solve a problem associated with the particular topic. Alternatively, as the first user's rating for a topic decreases relative to the second user's rating for that same topic, the probability that the first user will correctly solve the problem, relative to the second user, decreases.

In some implementations, and as described in further detail herein, when a user attempts a problem, the difficulty rating of the problem and the comprehension ratings (e.g., per concept that the problem is tagged with) of the user are updated in real-time. In some implementations, the user comprehension ratings (e.g., per concept that the problem is tagged with) are updated in real-time based, at least in part, on the difficulty rating of the problem that the user attempted, the user's comprehension rating before answering the problem, and/or whether the user correctly or incorrectly answered the problem. For example, an expected value may be determined for a user based on the difficulty of the problem being attempted (e.g., per concept the problem is tagged with). If the user correctly answers the problem, the expected value can be used, in part, to increase the user's comprehension rating for the tagged concept. If the user incorrectly answers the problem, the expected value can be used, in part, to decrease the user's comprehension rating for the tagged concept. The magnitude of the changes to the user's comprehension rating for the subject and the problem difficulty rating also can depend on the user comprehension rating prior to receiving the answer, the problem difficulty rating prior to receiving the answer, and whether the answer includes a correct or incorrect response. In some implementations, the difficulty rating of the problem can also be updated in real-time based on other user attempts at the problem. For example, a first user and a second user can concurrently attempt to answer a problem. The difficulty rating of the problem is updated in real-time based on the answers, whether correct or incorrect, of both the first user and the second user. Accordingly, as users interact with a problem, a user's ratings are indirectly based on other users' interactions with the problem.

The assignment and updating of problem difficulty ratings and user comprehension ratings that are intrinsically indicative of a user's relative skill level can be based on rating techniques used in multiplayer competitions, such as the Elo rating system. The Elo rating system is a method of for expressing relative skill levels among chess-players in which the difference in ratings between players is indicative of who is more likely to win a match between the players. A player's Elo rating can increase or decrease depending on the outcome of the game between the players. In contrast, in the present system, a user's rating is not updated based on a head to head challenge with another user but instead based on whether the user can incorrectly or correctly answer a problem associated with a particular problem difficulty rating that itself may be updated based following the user's attempt at solving the problem. Even though the users in the present system are not challenging one another head to head, the comprehension ratings associated with each user can still be used to provide an intrinsic indicator of both relative ability between users and each user's probability of successfully answering a particular practice problem.

In some implementations, the ratings are unbounded. That is, for example, there is no upper bound to a rating. In some examples, a rating instead indicates how the user's ability in a particular concept compares with a global population of users that interact with the online learning system.

In accordance with implementations of the present disclosure, a user's ratings are provided as input to a problem selection engine, which selects problems (in succession) to be displayed to the user based on the user's comprehension ratings, and the difficulty ratings of the problems. For example, a user can select one or more concepts to focus on (e.g., in a particular learning session). In some examples, the problem selection engine uses a hierarchy and dependency structure provided in the concept map, together with the user's individual per-concept comprehension ratings to select an appropriately-rated problem from an appropriate topic (or list of topics) to display to the user. For instance, the problem selection engine selects practice problems associated with difficulty ratings that are approximately equal to one or more of the comprehension ratings associated with the user. As a particular example, the problem selection engine can select a practice problem having a difficulty rating that is within a predetermined range of one or more comprehension ratings associated with the user (e.g., within +/−100 points relative to a user comprehension rating for an identified concept, within +/−50 points relative to a user comprehension rating for an identified concept, +/−25 points relative to a user comprehension rating for an identified concept, within +/−10 points relative to a user comprehension rating for an identified concept, or within +/−5 points relative to a user comprehension rating for an identified concept). In some examples, the problem selection engine does not just focus on prerequisite concepts until "mastery" is achieved, and then move on to next concepts. Instead, implementations of the present disclosure simultaneously explore multiple concepts in parallel, ramping up in problem difficulty rating across many topics at the same time. In this manner, the online learning system of the present disclosure does not include a notion of "mastery" in the conventional sense, and instead provides numeric ratings at each concept, which ratings can go arbitrarily high. Accordingly, the user can, for example, experience learning "Algebra" by selecting Algebra-related topics, and entering a stream of problems, which tour the topics, ramping up in difficulty based upon the user's successful interaction with the problems. During that time, the user may observe a ratings increase across many sub-topics within Algebra (and/or within other subject-matter areas) in parallel, and can stop when satisfied with the numbers.

FIGS. 2A-2D depict example user interfaces in accordance with implementations of the present disclosure.

Figure 2A:
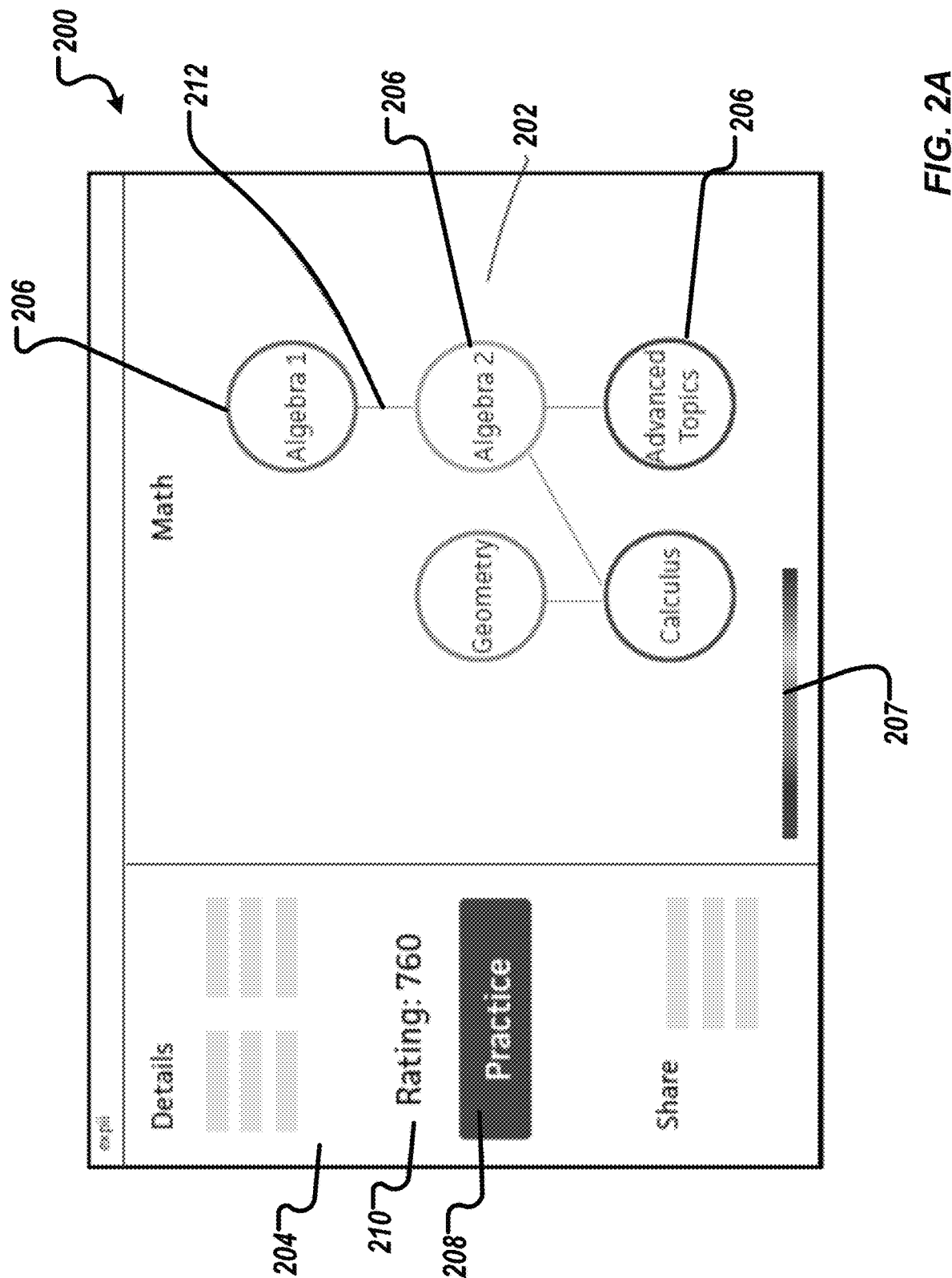
FIGS. 2A-2D depict example user interfaces in accordance with implementations of the present disclosure.

FIG. 2A is an example user interface of a navigator pane 200 output to a display by an interactive learning system (e.g., system 108) according to the present disclosure. The navigator pane 200 includes two sections: a topic map pane 202 and a practice-selection pane 204. The topic map pane 202 provides an interactive map through which a user may explore different subject-matter areas based on a hierarchy approach. For instance, the topic map pane 202 can display the title of a general topic/subject matter area to review, such as "Math" shown in FIG. 2A, as well as one or more different sub-topics within the general topic area. The different sub-topics can be represented within the pane 202 using interactive icons or nodes 206. For instance, as shown in FIG. 2A, the icons/nodes 206 representing the sub-topics for "Math" are labeled as "Geometry," "Algebra 1," "Algebra 2," "Calculus," and "Advanced Topics." In some implementations, the topic map can be displayed as a network of interconnected nodes 206, in which each node 206 corresponds to a topic or sub-topic, with pre-requisite dependencies indicated by lines. For instance, the nodes 206 illustrated in FIG. 2A are connected by lines 212 to depict the relationship between topics/sub-topics within the hierarchy. In the illustrated example, when two topics are connected by a line, the topic which appears higher up is a pre-requisite of the topic which appears lower down. A user can select one or more of the nodes 206 to further explore the topic map. That is, upon selection of a node 206 (e.g., by clicking the icon or swiping with a predetermined gesture), the topic map pane 202 can provide the user with a detailed view of additional topics within the selected sub-topic. For example, upon selection of the "Geometry" node, the topic map pane 202 can output to the display a new collection of icons/nodes representative of sub-topics within Geometry. The newly displayed collection of sub-topics may also be presented as a hierarchical pre-requisite network of interconnected nodes. The navigation pane 200 also can include, e.g., a button or other icon that allows a user to move back up the topic map. Alternatively, in some implementations, upon selection of a node 206 within the tree, a new user interface may be displayed with information on the selected topic and/or practice problems related to the selected topic.

Alternatively, in some implementations, the interactive learning system allows users to select various different nodes for review and focus, so that the system can identify and present to the user one or more practice problems that are associated with at least one of the selected topics. The selected topics do not need to be within a single topic map. For instance, the interactive learning system may allow a user to select one or more sub-topics within the general topic of "geometry" but also allow the user to change the topic pane view to show a different hierarchical map associated with a different subject, such as biology, from which the user can further select one or more sub-topics. Subsequently, the user may command the system to display problems based on the selected topics, such that the user is presented with a practice problem that tests the user's knowledge of one or more of the selected geometry sub-topics and one or more of the selected biology sub-topics. In some implementations, the topics/concept areas may be identified and selected through a search box that is present on one or more pages displayed by the system. For example, a user may enter a particular concept area in which the user wishes to attempt practice problems, and the interactive learning system will identify and output to a display a list of practice problems covering issues within the identified concept area. The practice problems may be determined and selected to match with the user's comprehension rating in the specific concept area. For example, the user comprehension system may select and display problems having a difficulty rating in the selected concept area that is within a predetermined range of one or more comprehension ratings of the user in the selected concept area (e.g., within +/−100 points relative to a user comprehension rating for an identified concept, within +/−50 points relative to a user comprehension rating for an identified concept, +/−25 points relative to a user comprehension rating for an identified concept, within +/−10 points relative to a user comprehension rating for an identified concept, or within +/−5 points relative to a user comprehension rating for an identified concept).

In some implementations, the icons 206 are graphically modified to indicate additional information. For instance, in the example shown in FIG. 2A each of the icons 206 is a circle, in which the circle can have a different color. The color can be indicative of the user's comprehension rating for the corresponding sub-topic. As an example, purple might be indicative of a low comprehension rating of the corresponding sub-topic, whereas red might be indicative of high comprehension rating for the corresponding sub-topic. A color-key 207 can be provided on the navigation pane 200 to assist the user in determining the comprehension rating. Alternatively, or in addition, comprehension ratings may be provided explicitly using a numeric rating system, in which each sub-topic is shown with a corresponding value indicative of the user's understanding of the sub-topic. For example, a value of 100 might be indicative of a low comprehension rating of the corresponding sub-topic, whereas a value of 2000 might be indicative of high comprehension rating for the corresponding sub-topic. As explained herein, the comprehension ratings can be unbounded such that there is no maximum limit to the comprehension value associated with a topic or sub-topic. In practice, however, the ratings are unlikely to rise infinitely high. For example, in certain implementations, the ratings only increase in value as the user successfully solves higher-rated practice problems. But a practice problem may, in such implementations, only increase in value after being solved by a user having a similar or higher rating. Accordingly, in such cases, the maximum spread in ratings may be effectively limited as a function of the population.

The practice-selection pane 204 provides an interactive icon 208 through which a user can elect to attempt one or more practice problems associated with the general topic (either through direct association with the topic or through association with any sub-topic contained within the hierarchy) represented by the topic map selection pane 202. The icon 208 can be selected, e.g., by clicking on the icon or by swiping with a predetermined gesture in the case an interactive touch screen is used. Upon selection of the icon 208, the interactive learning system outputs to the display a practice problem associated with one of the topics or sub-topics identified by the topic pane 202. In some implementations, the interactive learning system selects a practice problem having a difficulty rating that is close to the user comprehension rating for one of the selected topics. In certain cases, the user selects multiple topics, such that the interactive learning system selects a practice problem having a difficulty rating close to the user comprehension ratings for those topics. An example of a user interface with which a user can attempt to answer a practice problem is shown in FIG. 2C.

In some implementations, the navigation pane 200 includes additional information. For example, the navigation pane 200 can include an overall comprehension rating 210 for the general topic represented by the topic map selection pane 202. The overall comprehension rating 210 is indicative of the user's overall comprehension of the general topic. For instance, in the example shown in FIG. 2A, the user is provided with an overall comprehension rating of 760 for the topic "Math." The overall comprehension rating 210 can, in some implementations, be a function of the sub-topics contained within the general topic. For instance, the overall comprehension rating 210 can be expressed as a weighted average of the ratings associated with the sub-topics, in which the weighting is determined based on the hierarchy of the sub-topics (e.g., topics at the bottom of the hierarchy have a smaller weighting than topics further up the hierarchy). The overall comprehension rating 210 can be located either within the practice-selection pane 204 or the topic map pane 202. In some implementations, the additional information includes a description of the selected topic (e.g., instructional material or a general explanation of the selected topic) and/or icons and links through which users can share information about their performance.

In some implementations, the topic icons are graphically modified to indicate whether there are additional sub-topics the user can explore by selecting the icons. For example, the icons 206 shown in FIG. 2A are presented so they have a shape of a circle. The circle shape signifies to the user that, upon selection of the icon, additional sub-topics will be presented to the user within the topic map pane 202. If the icon is presented with a different shape, such as a rectangle, the different shape can indicate that no further sub-topics are available upon selection of the icon. Rather, the interactive learning system will move from the navigation pane to a topic pane. Indicating whether additional sub-topics are available for exploration is not limited to the use of shapes. For example, the icons could include explicit text to indicate that additional sub-topics are available. Alternatively, or in addition, the color of the icons may be varied to indicate that additional sub-topics are available. Other modifications are possible as well.

Although the topic map is presented within FIG. 2A as a series of separate selectable icons, the topic map is not limited to this representation. For instance, in some implementations, the topic map can be displayed as a tree of interconnected nodes, in which each node corresponds to a topic or sub-topic, with sub-topics branching off of more general subjects. Upon selection of a node within the tree, a new user interface may be displayed with information on the selected topic and/or practice problems related to the selected topic.

Figure 2B:
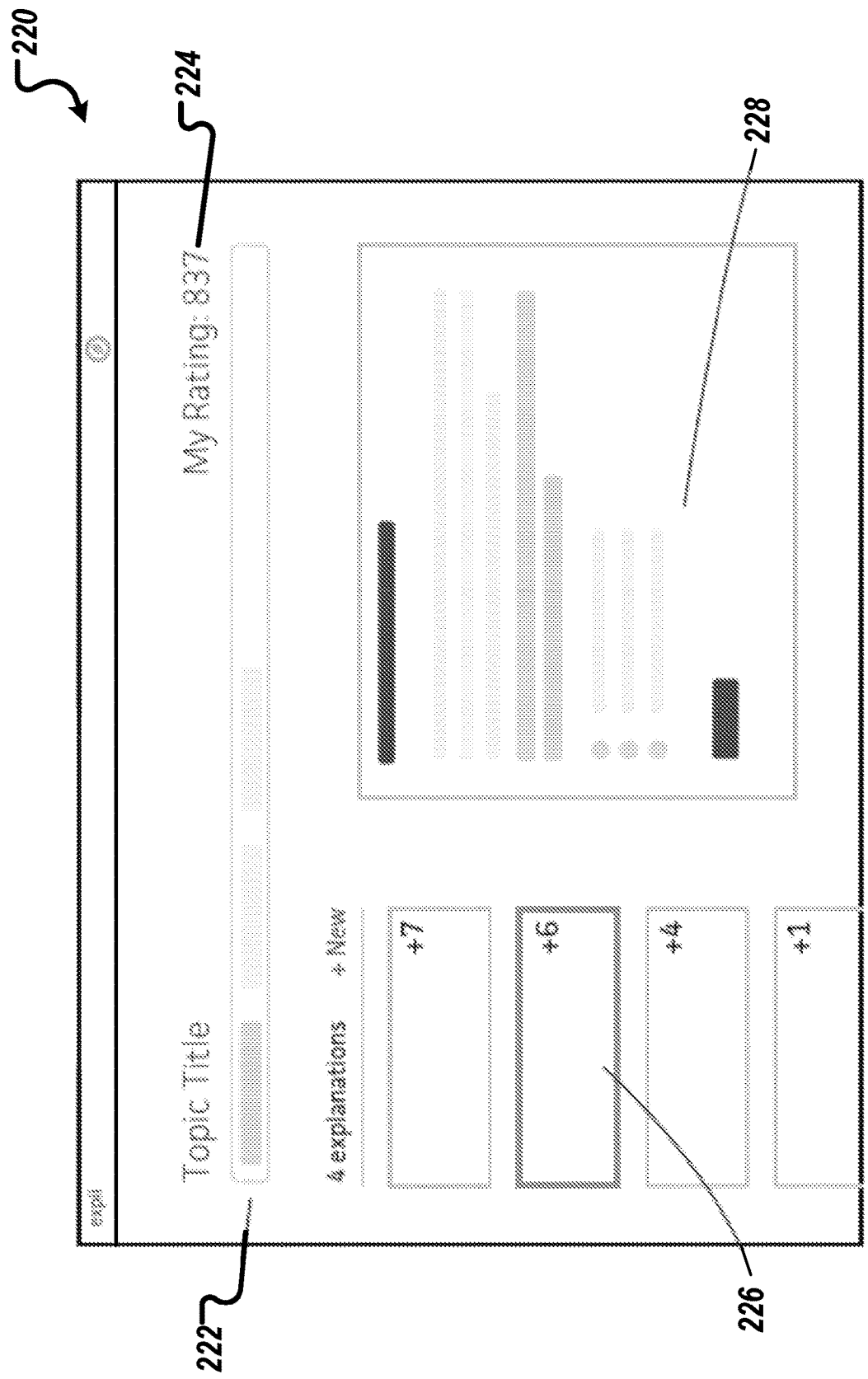
Figure 2C:
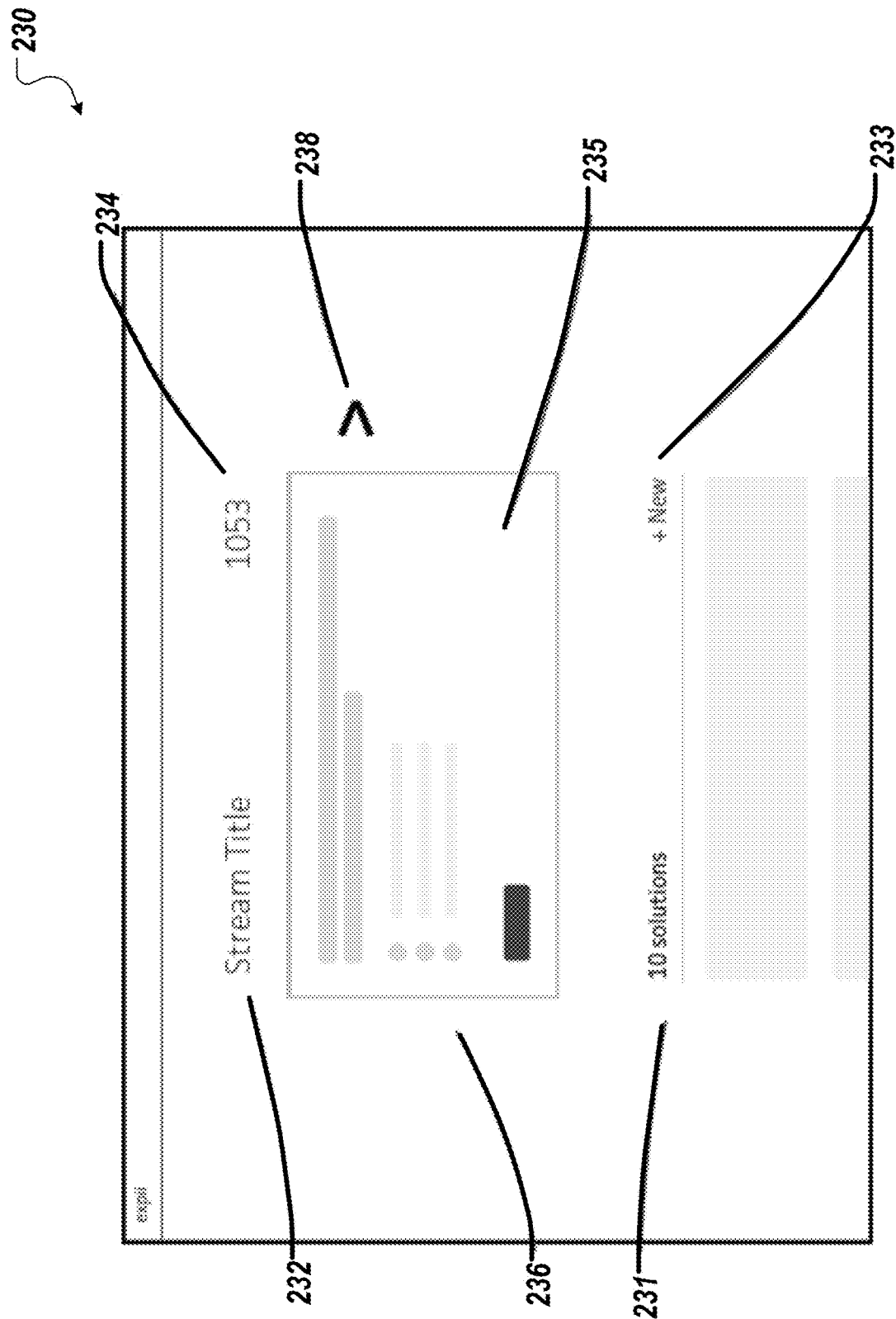

FIG. 2B is an example user interface of a topic page 220 that appears once a user selects a topic from the topic map. The topic page 220 can include, e.g., a description pane 222 in which a description of the selected topic can be provided. The description can include additional educational information about the topic. In some implementations, the topic page 220 can include, e.g., a rating indicator 224 that provides the user with the user's own comprehension rating specific for the selected topic. For example, the comprehension rating can include a numeric value or, alternatively, a baseline or null value if the user has not attempted any practice problems corresponding to the selected topic yet. In some implementations, the topic page 220 includes a problem/explanation selection pane 226. The problem/explanation selection pane 226 can display either a list of practice problems associated with the selected topic or a list of explanations corresponding to the practice problems depending on the user selection. A user may switch between the two different views, e.g., by selecting an appropriate icon displayed within the topic page 220 or through the use of predetermined gesture in case an interactive touch screen is used. The user can also select one of the problems or explanations from the problem/explanation selection pane 226 and have the selected problem or explanation displayed within a main window 228 of the topic page 220 for the user to read. In the case a problem is selected, the user will also be allowed to attempt an answer to problem within the main window 228. For instance, the user may enter a numeric value as an answer to the practice problem or, alternatively, the user may make a selection from a multiple choice list, or even submit some other form of input, such as from a smartphone camera or alternative input device. In the case an explanation is selected, the main window 228 will provide the user with an explanation as to how to solve a corresponding practice problem.

Figure 2D:
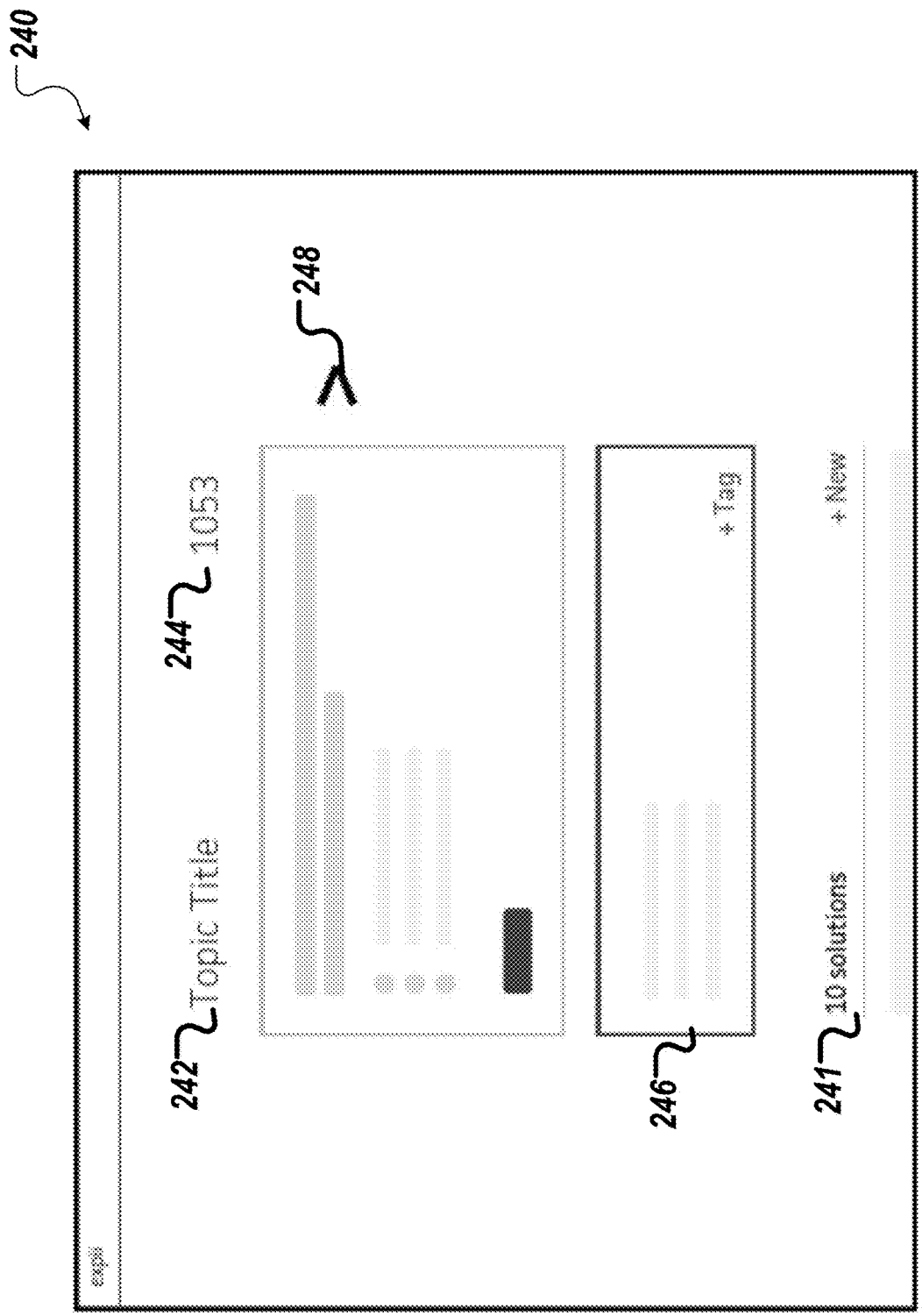

FIG. 2C is an example of a user interface of a practice problem page 230 with which a user can attempt to answer a practice problem. The practice problem page 230 can include, e.g., the title 232 of the topic that the user chose to practice. For instance, the title 232 could include the general topic "Math" or any of the sub-topics such as "Geometry," "Algebra 1," Algebra 2," "Calculus," or "Advanced Topics," as shown in FIG. 2A. The practice problem page 230 can include the user's comprehension rating 234 (e.g., a numeric value) for the selected topic. In some implementations, the practice problem that the user will attempt is tagged with/identified by multiple different subject matter areas. In such cases, the user's comprehension rating for each of those areas can also be displayed within the practice problem page 230. Alternatively, or in addition, the practice problem page 230 can include the difficulty rating (e.g., also a numerical value) for the practice problem currently being displayed on the user interface. The difficulty rating can be displayed before or after the user answers the problem. The practice problem page 230 can include a problem area 236 in which an interactive practice problem is displayed. The problem area 236 can include, e.g., a region 235 in which the text setting forth the problem is displayed. The problem area 236 also can include another region in which a user submits or selects an answer, such as a text entry region or a list of multiple choice answers, or a user interface element to submit alternative forms of input from, e.g., a smartphone camera. The user may be given the option to select a button or icon 238 that allows the user to switch from a current practice problem to a next problem or previous problem related to the selected topic area. In some implementations, the practice problem page 230 also can include a solution section 231 that includes a list of one or more different solutions to the displayed problem. The solutions can include different independently confirmed approaches to correctly solving the displayed practice problem. The solutions may be hidden before a user answers the practice problem (e.g., partially or completely obscured or modified so the solutions cannot be seen prior to answering the problem) and then displayed to the user subsequent to the user answering the practice problem. The solution section 231 can include a button for allowing users to approve of a particular solution to the practice problem. Solutions can be automatically organized within the solution section 231 so that solutions having the greatest number of approvals (e.g., a high approval rating) are arranged prominently for the user to see (e.g., at the top of a list). The solution section 231 also can include a button 233 that, upon selection, allows a user to enter a proposed solution to the practice problem for other users to view. The practice problem page 230 shown in FIG. 2C can be displayed, e.g., responsive to a user selecting the interactive icon 208 within navigation pane 200. Alternatively, the problem page 230 can be displayed, e.g., after a user selects one of the problems listed in the topic page 220 shown in FIG. 2B FIG. 2D is an example of a user interface of an answer page 240 that is displayed subsequent to the user answering the practice problem. Similar to the practice problem page 230, the answer page 240 can include a title section 242 identifying the topic associated with the practice problem that was previously attempted. The answer page 240 also can include a solutions section 241 that displays solutions to the practice problem that was previously attempted. In contrast to the practice problem page 230, the solutions can be displayed without being hidden.

In the case the user has incorrectly answered the practice problem, as determined by the interactive learning system, the answer page 240 can display a message in a message section 246 notifying the user that the answer was incorrect. Additionally, the user's comprehension rating(s) 244 for the topic(s) associated with the previously attempted practice problem can be updated to reflect that the user answered the problem incorrectly. For instance, the comprehension rating 244 can include a numeric value that decreases. Similarly, if the practice problem was associated with multiple topics/subject-matter areas, a user comprehension score can be displayed for each topic and likewise may be updated to reflect that the user incorrectly answered the problem. Similarly, the difficulty rating of the problem previously attempted can be displayed and updated, as well. For instance, the difficulty rating may include a numeric value that increases as a result of the incorrect answer. In some implementations, the answer page 240 can provide a button, link or icon that allows the user to attempt to answer the practice problem again, with or without the next attempt affecting the user's comprehension score.

In the case the user has correctly answered the practice problem, as determined by the interactive learning system, the answer page 240 can display a message in the message section 246 notifying the user that the answer was correct. The user's comprehension rating 244 for the topic(s) associated with the previously attempted practice problem can be updated to reflect that the user answered the problem correctly, such as displaying an increase in a numeric value. Similarly, the difficulty rating of the problem previously attempted can be updated, such as displaying a decrease in the difficulty rating value. Again, the answer page 240 can provide a button, link or icon that allows the user to attempt to answer the practice problem again, with or without the next attempt affecting the user's comprehension score.

Whether the user correctly or incorrectly answers the problem, the answer page 240 can include a button or icon 248 that allows the user to load a new problem or a previous problem related to the selected topic area. When loading a new problem, the interactive learning system can automatically identify from memory and display a new practice problem that has a problem difficulty rating that is close to the user comprehension rating for one of the selected topic(s). For instance, the interactive learning system can identify one or more problems having problem difficulty ratings within a predetermined range of the user's comprehension rating for a selected topic (e.g., within +/−10 points relative to the user's comprehension rating, within +/−25 points relative to the user's comprehension rating, within +/−50 points relative to the user's comprehension rating, within +/−100 relative to the user's comprehension rating, or within +/−200 points relative to the user's comprehension rating) and then select one of the identified problems for display to the user on a new practice problem page. The interactive learning system can, in some implementations, further select the new practice problem randomly from the identified problems. Alternatively, or in addition, the interactive learning system can, in some implementations, select the new practice problem based on whether the user has previously attempted one or more of the identified problems (e.g., select only those problems for display that the user has not yet attempted). Alternatively, or in addition, the interactive learning system can, in some implementations, select the new practice problem based on whether the problems are associated/tagged with the topic and/or topics the user has selected for learning. In some implementations, the interactive learning system may, in some implementations, expand the list of topics for the user to practice and review. For instance, the interactive learning system may identify and present to the user problems associated with topics earlier in the pre-requisite structure (e.g., topics that are more basic, such as Algebra being earlier than Calculus in math), even if the topics have not been selected by the user. As an example, if the user comprehension rating falls below a predetermined value for a particular topic or group of topics or the user has been incorrectly answering problems above a predetermined fraction or percentage (e.g., above 50% of problems wrong, above 60% of problems wrong, or above 70% of problems wrong, among other values), the interactive learning system may output to a display an expanded list of problems to practice, some of which are associated with a topic earlier in the pre-requisite structure so that the user may focus on strengthening their performance and understanding of more basic concepts. Similarly, if the user comprehension rating increases above a predetermined value for a particular topic or group of topics or the user has been correctly answering problems above a predetermined fraction or percentage (e.g., above 50%, above 60%, or above 70% of problems correct, among other values), the interactive learning system may output to a display an expanded list of problems to practice, some of which are associated with a topic later in the pre-requisite structure so that the user may enhance their understanding of more advanced concepts. Thus, determining the problems that are to be selected and displayed to a user may rely on evaluating the topic or subject matter area identified by the user as well as the user's performance.

As an example, the interactive learning system can perform an algorithm that takes, as inputs, the following parameters: 1) the user's comprehension rating across all the topics within the displayed topic map (or, e.g., the user's comprehension rating across different topic maps, even if not displayed); 2) the pre-requisite structure and/or hierarchical/containment between topics in the one or more topic maps (i.e., the pre-requisite or underlying topics that one comprehends in order to understand the selected topic); and/or 3) the list of topics that the user has selected to focus on.

The example algorithm, when implemented by the interactive learning system, will make a decision on what problem to display by selecting a topic (e.g., randomly) within the list of topics identified by the user, and choosing a problem rating for that topic that is approximately the same as the user's comprehension rating for the topic. For instance, the system may choose a problem rating of 700 for a user having a comprehension rating of around 700 for a selected topic. In some implementations, the interactive learning system will further take into account pre-requisite structure between topics, e.g., by selecting a problem having a problem rating that is less than or equal to the user's comprehension ratings at the pre-requisite topics minus some amount (representing the mental leap required to move to the next topic). So, for example, if a user's comprehension rating in topic T is 700 and their comprehension ratings in the pre-requisite topics are also 700, the interactive learning system will select problems within topic T having a problem rating that is less than or approximately equal to, e.g., 400.

If a selected topic does not include or is not associated with problems at the identified rating (e.g., if all problems in topic T are rated 600+), a problem from a different topic (e.g., another topic in the list identified by the user, or one of the pre-requisite topics for topic T) may be selected instead. In this way, the interactive learning system naturally starts with topics early in the pre-requisite structure (e.g., topics that are more basic, such as Algebra being earlier than Calculus in math), with lower-rated problems. As the algorithm proceeds and the user's ratings increase, the user faces higher-rated problems from the early part of the pre-requisite structure. As the user accumulates higher ratings in the early topics (with respect to the pre-requisite structure), the user starts to see problems from later topics (with respect to the pre-requisite structure), starting with lower-rated problems in those topics. Other algorithms for selecting problems are also possible.

Figure 3:
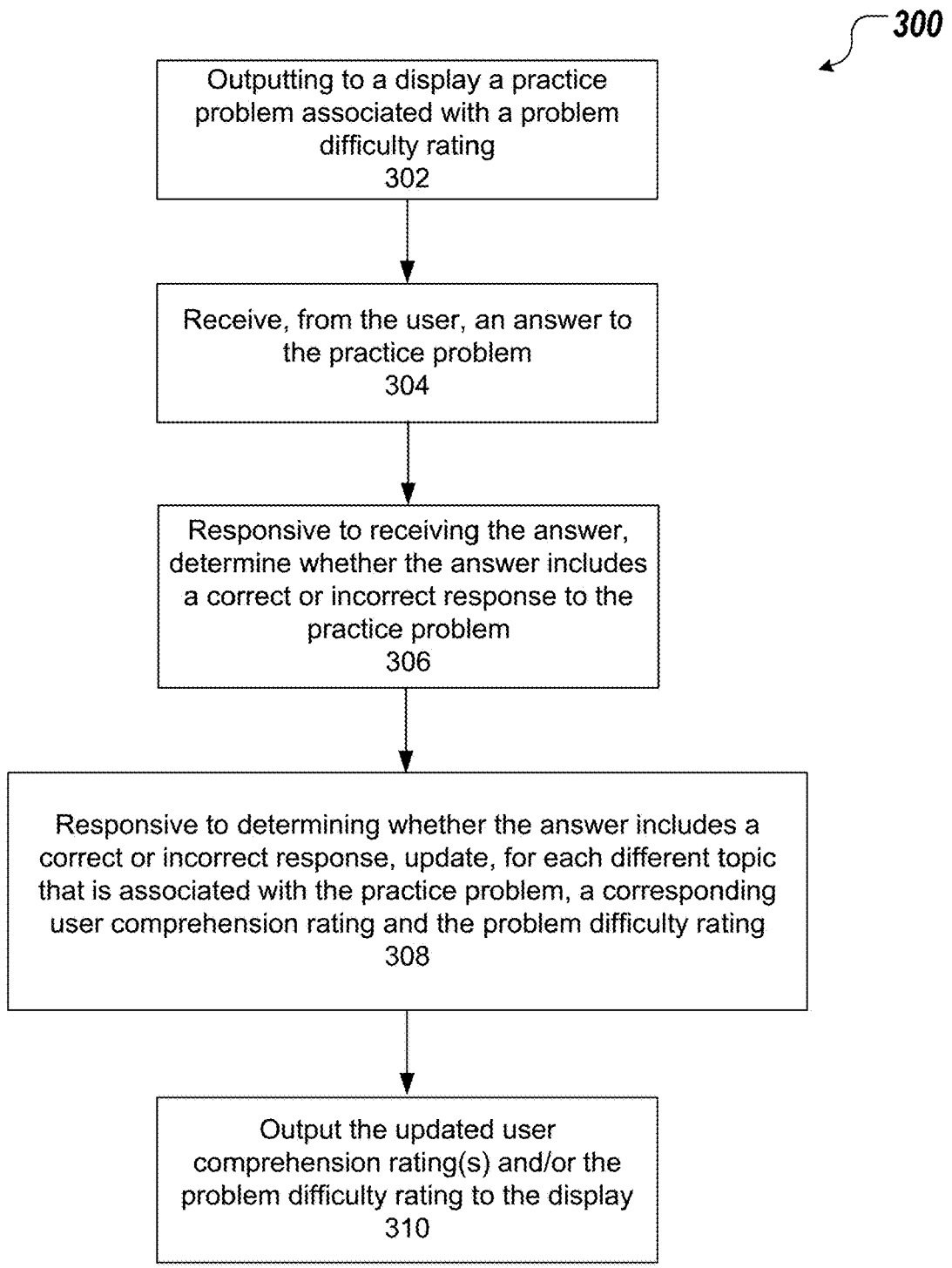
FIG. 3 is a flowchart illustrating an example process that can be executed in implementations of the present disclosure.

FIG. 3 is a flowchart illustrating an example process 300 that can be executed in implementations of the present disclosure. In some implementations, the example process 300 can be realized using one or more computer-executable programs that are executed using one or more computing devices (e.g., such as the server system 108 and/or the computing devices 102, 104 shown in FIG. 1). The process 300 provides an example of a method for adaptive learning, in which the method includes outputting (302), from the one or more computing devices to a display, a practice problem associated with a problem difficulty rating. The practice problem can be identified by one or more concept tags, each concept tag relating to a different subject-matter area that forms a basis of the practice problem. For instance, the concept tag(s) can correspond to the topic and/or topics selected from the navigator pane 200 shown in FIG. 2A. The practice problems and their associated concept tags can be selected from and stored in a database managed by the one or more computing devices. In some implementations, prior to outputting the practice problem to the display, the method includes determining a user's comprehension rating for a specific topic or set of topics and then identifying a potential practice problem having a problem difficulty rating that is close to the user's comprehension rating(s). For instance, the one or more computing devices can identify a practice problem associated with a difficulty rating that is within a predetermined range of at least one user specific comprehension rating, and then select the identified potential problem as the practice problem to output to the display. Identifying the potential practice problem can include identifying a problem that the specified user has not previously attempted. Alternatively, or in addition, identifying the practice problem can include identifying a problem associated with at least one topic that corresponds to a subject-matter area selected by the user.

After the practice problem is output to the display, the one or more computing devices can receive (304), from the user, an answer to the practice problem. For instance, the answer can be entered as a numeric or string value, as a selection from a multiple choice list, or via an alternative input method such as a smartphone camera. In response to receiving the answer, the one or more computing devices determine (306) whether the answer includes a correct or incorrect response to the practice problem. In response to determining whether the answer includes a correct or incorrect response, the one or more computing devices then update (308), for each different topic that is associated with the practice problem, a corresponding user comprehension rating. Similarly, the one or more computing devices can update the problem difficulty rating. For instance, the comprehension rating can be increased whereas the problem difficulty rating can be decreased when a user correctly answers a problem. Conversely, the comprehension rating can be decreased whereas the problem difficulty rating can be increased when a user incorrectly answers a problem. The updated user comprehension rating(s) and/or the problem difficulty rating then can be output (310) to the display.

In some implementations, the updated user comprehension rating is not output to the display. Instead, in some implementations, the one or more computing devices output feedback. The feedback can be in the form of text, audio or visual feedback. For example, if a user comprehension rating substantially increases (e.g., by greater than 1%, 2%, 3%, 5%, or 10%, among other increases), the one or more computing devices may output feedback in the form of reinforcement, such as text stating "Great job! We're going to give you harder problems to practice, to further develop your strength in this concept," to keep the user motivated. Alternatively, if the user comprehension rating decreases (e.g., by 1%, 2%, 3%, 5%, or 10%, among other decreases), the one or more computing devices may output feedback in the form of reassurance, such as text stating "Don't worry. Let's try to figure out where you might be confused. Let's back up a bit and practice an earlier concept." By providing feedback instead of a specific user comprehension rating, a user may be less discouraged and more inclined to continue attempting practice problems.

In other implementations, the one or more computing devices may output to the display, in place of or in addition to a user comprehension rating, information that the user may use to evaluate how well they are performing. For instance, the one or more computing devices may output to the display one or more graphs, charts, plots, or diagrams depicting how the user is faring relative to other users of the system. As an example, the one or more graphs, charts, plots, or diagrams may include a histogram representing ratings of other users on the particular concept associated with the problems the user is attempting. The histogram may include a marker (e.g., a star, a point, or an arrow) depicting where the rating associated with the user is relative to other users of the system. Alternatively, or in addition, the one or more devices may translate the user comprehension rating into a color indicative of the user's relative understanding of the concept being studied. For example, a user having a user comprehension rating at about the 50$^{th}$ percentile may be depicted on the display by a background or an object that is colored blue, whereas users having user comprehension ratings at about the 90th and 20th percentiles may be represented by a background or object that is colored green and red, respectively.

Figure 4:
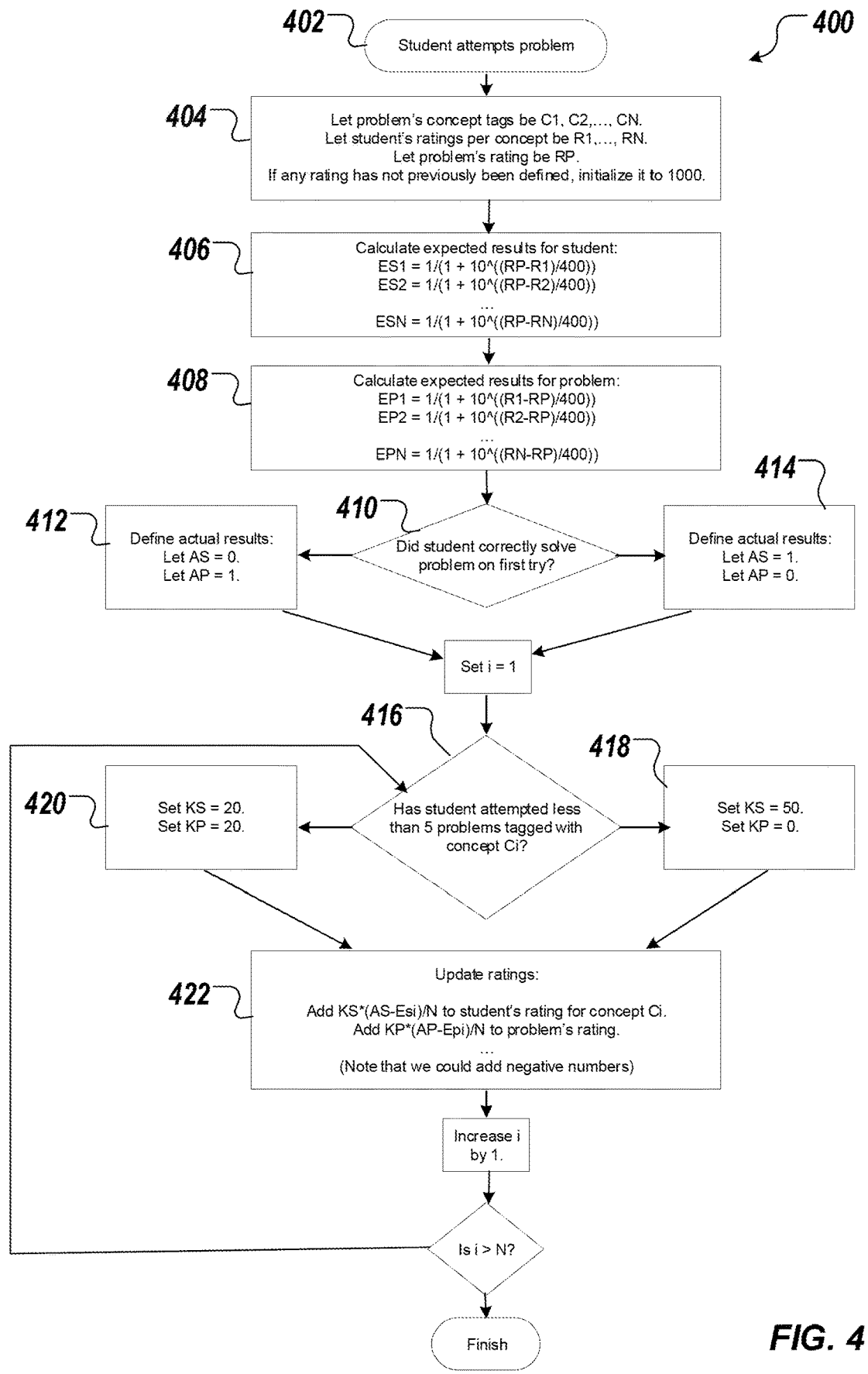
FIG. 4 is a flowchart illustrating another example process 400 that can be executed in implementations of the present disclosure.

FIG. 4 is a flowchart illustrating another example process 400 that can be executed in implementations of the present disclosure. In some implementations, one or more steps of the example process 400 can be realized using one or more computer-executable programs that are executed using one or more computing devices (e.g., such as the server system 108 and/or the computing devices 102, 104 shown in FIG. 1). The process 400 provides an example of a method of updating a user-specific comprehension rating and a problem difficulty rating, though other ways of updating the ratings are possible as well. For example, in some implementations, the process for updating user-specific comprehension ratings and problem difficulty ratings may be styled after any one of the Elo rating system variations used in chess competitions.

In process 400, a user, such as a student attempting to learn about a particular subject-matter area, attempts (402) to answer a practice problem. For example, the student can attempt to answer a problem displayed on practice problem page 230, as shown in FIG. 2C. The one or more computing devices can assign (404) to the practice problem one or more concept tags $C_1, C_2 \ldots C_N$, where each concept tag corresponds to a topic/subject matter area that forms a basis for the practice problem, and where N corresponds to the total number of topics associated with the practice problem. For each concept, the one or more computing devices can also associate (404) with the user a corresponding comprehension rating $R_1, R_2 \ldots R_N$. Similarly, the practice problem can be associated (404) with a problem difficulty rating $R_P$. If any of the user comprehension ratings or the problem difficulty rating have not been previously defined, the rating can be initialized to a predefined value, e.g., to a value of 1000 or some other value.

An expected result value for the user, ES, then is determined (406) for each different concept associated with the practice problem. In the example process 400, the expected result value for each concept tag is derived based, at least in part, on both the difficulty rating for the problem and the user's comprehension rating for the corresponding concept tag. For instance, the expected user result value for the Nth concept associated with the problem can be expressed as follows:

$$ES_N = 1/(1+10^{((R_P - R_N)/400)}).$$

Other equations for specifying the expected user result value can be used instead. Similarly, an expected result value for the problem, EP, is determined (408) for each different concept associated with the practice problem. Like the user expected results, the problem expected result can be derived based, at least in part, on both the difficulty rating for the problem and the user's comprehension rating for the corresponding concept tag. For instance, the expected problem result value for the Nth concept associated with the problem can be expressed as follows:

$$EP_N = 1/(1+10^{((R_N - R_P)/400)}).$$

Other equations for deriving the expected problem result value can be used instead.

The user's answer then is evaluated to determine (410) whether the user correctly or incorrectly answered the practice problem. In both cases, an actual result parameter is assigned (412, 414) a value for both the user and the problem. For instance, if the user fails to correctly answer the question, an actual user result parameter, AS, is assigned (412) a value 0, indicating that the user was unsuccessful, whereas an actual problem result parameter, AP, is assigned (412) a value 1, indicating that the problem was not solved. If the user correctly answers the question, however, the actual user result parameter, AS is assigned (414) a value 1, whereas the actual problem result parameter AP is assigned (414) a value 0. The purpose of setting the actual result parameters is so that, when the comprehension ratings are derived, a rating increases for those users that correctly answered the problem and decreases when the user incorrectly answers the problem.

After setting the actual result parameters, a series of operations are performed for each concept associated with the practice problem to update the user's comprehension rating and the problem difficulty rating. The operations include, for example, determining (416) whether the user has attempted to answer more or less than a predetermined number of practice problems tagged with the concept. For instance, in the example process 400 a check is made to determine the user has attempted to perform less than 5 problems tagged with the concept Ci, where i=1 . . . N.

There are multiple purposes for performing the check in step (416). First, the check allows the system to determine whether a user is relatively new (e.g., they have not attempted many problems tagged with the identified concept) and, if so, reduce the effect that the relatively new user's answers have on the problem difficulty rating. For instance, if the user has attempted less than the predetermined number of problems tagged with the concept (e.g., less than 5 attempts), then a parameter KP representing how quickly the problem difficulty rating should change is set (418) to a first value, such as zero. In contrast, if the user has attempted more than or equal to the predetermined number of problems tagged with the concept, then the parameter KP representing how quickly the problem difficulty rating should change is set (420) to a second value greater than the first value, such as 20.

Second, the check allows the system to determine how quickly the user comprehension rating should be adjusted, with users attempting a relatively small number of problems tagged with the concept receiving a greater change in their user comprehension rating than a user that has attempted to answer a relatively large number of problems tagged with the concept. For instance, if the user has attempted less than the predetermined number of problems tagged with the concept (e.g., less than 5 attempts), then a parameter KS representing how quickly the user's comprehension rating for the concept should change is set (418) to a first value, such as 50. In contrast, if the user has attempted more than or equal to the predetermined number of problems tagged with the concept, then the parameter KS representing how quickly the user comprehension rating for the concept should change is set (420) to a second value less than the first value, such as 20.

With the values for AS, AP, KS, and KP set, then the problem difficulty rating $R_P$ and the user comprehension ratings for the N concepts, $R_1, \ldots, R_N$ are updated (422). For instance, the new user comprehension rating "$R_N$ New" for the Nth concept can be expressed as:

$$R_N\text{New}=KS*(AS-ES_N)/N+R_N$$

and the new problem difficulty rating "$R_P$ New" can be expressed as:

$$R_P\text{New}=KP*(AP-EP_N)/N+R_P$$

where $R_N$ and $R_P$ are the old user comprehension rating and problem difficulty rating, respectively. Other equations for deriving the new user comprehension rating and the new problem difficulty rating can be used instead.

The processes performed in steps (416) through (422) then are repeated for each different concept with which the practice problem has been associated. Multiple different variations for updating a user-specific comprehension rating and a problem difficulty rating are also possible. For example, in some implementations, the evaluation performed in (410) to determine whether the user correctly or incorrectly answered the practice problem can include determining whether the user correctly or incorrectly answered the practice problem on the first try (e.g., the first attempt at that particular problem). In some implementations, the process may include a determination as to whether the user skipped a problem after the problem is displayed. If the user skips the problem, this may be used by the algorithm to decrease the user's comprehension rating. In some implementations, the process may include a determination as to whether the user took more or less than a predetermined amount of time before attempting to answer a problem or before completing an answer to a problem. For example, if the user took more than the predetermined amount of time to attempt to answer or to solve the problem, the system may provide only partial credit to the user's comprehension rating even if the user correctly solves the problem.

Figure 5:
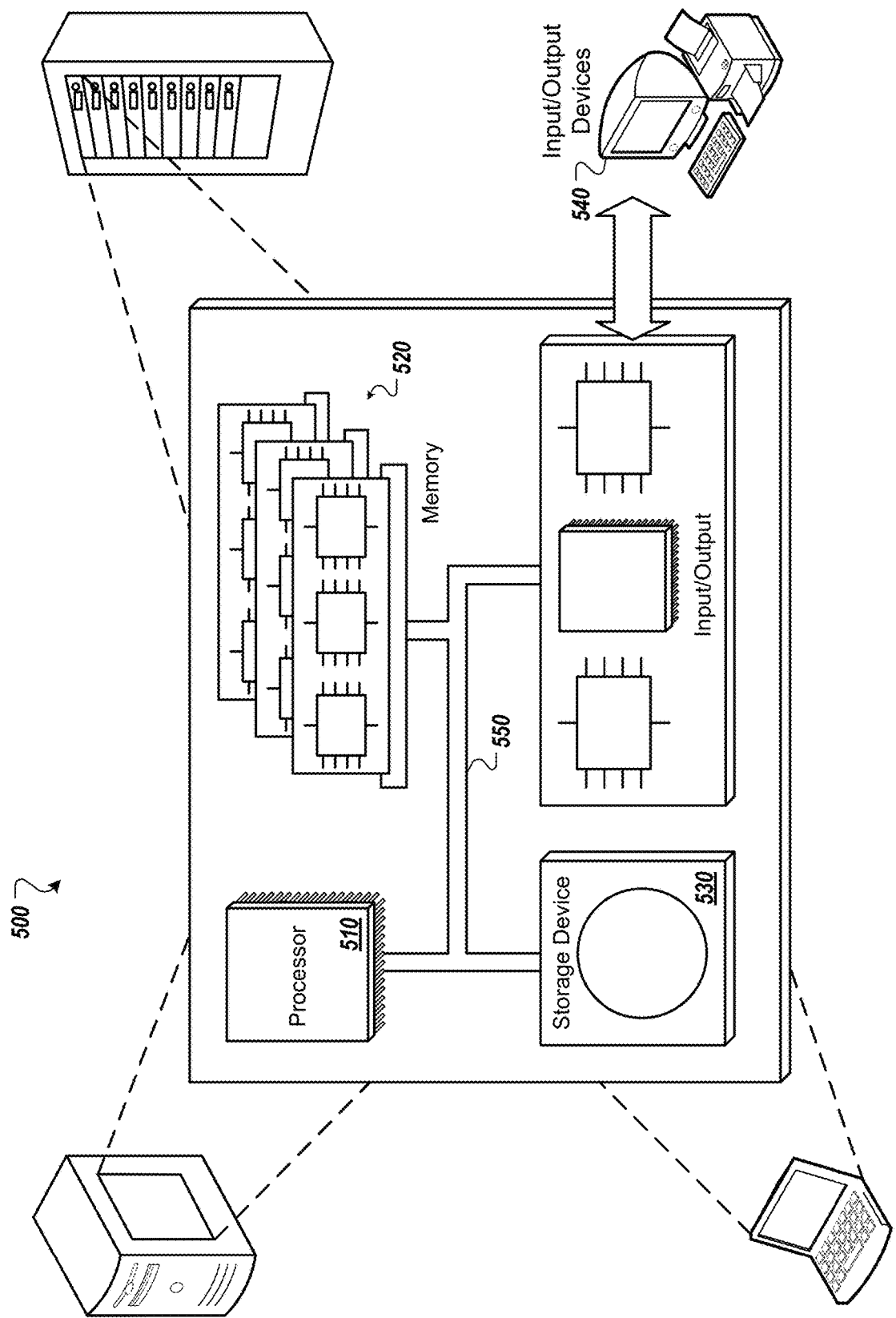
FIG. 5 is a schematic illustration of example computer systems 500 that can be used to execute implementations of the present disclosure.

FIG. 5 is a schematic illustration of example computer systems 500 that can be used to execute implementations of the present disclosure. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 400. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for adaptive learning, the method being executed using one or more processors and comprising:
    outputting, from the one or more processors executing an interactive learning program of an online learning system, a practice problem having a current problem difficulty rating to an interactive graphical user interface, wherein the practice problem is identified by one or more concept tags, each concept tag relating to a different subject-matter area that forms a basis of the practice problem, wherein the current problem difficulty rating is derived based on whether one or more users previously answered the practice problem correctly or incorrectly;
    receiving, by the one or more processors and from the interactive graphical user interface, an answer from a first user to the practice problem;
    responsive to receiving the answer, determining whether the answer includes a correct or incorrect response to the practice problem;
    responsive to determining whether the answer includes a correct or incorrect response,
        automatically updating in real-time, for each of the different subject-matter areas that forms a basis of the practice problem, a corresponding user specific comprehension rating for the first user based on the current problem difficulty rating to provide an updated user specific comprehension ratings, such that the updated user specific comprehension rating is indirectly based on other user responses to the practice problem and directly based on the first user's response to the practice problem, and
        automatically updating in real-time, for each of the different subject-matter areas that forms the basis of the practice problem, the current problem difficulty rating of the practice problem to provide an updated problem difficulty rating, such that the updated problem difficulty rating is indirectly based on other user responses to the practice problem and directly based on the first user's response to the practice problem,
    wherein a magnitude of the changes to the user specific comprehension rating and to the current problem difficulty rating depends on the user specific comprehension rating prior to receiving the answer, the current problem difficulty rating prior to receiving the answer, and whether the answer includes a correct or incorrect response;
    outputting, for at least one of the different subject-matter areas that forms the basis of the practice problem, the updated user specific comprehension rating to the interactive graphical user interface; and
    subsequent to automatically updating the corresponding user specific comprehension rating for each of the different subject-matter areas,
    automatically outputting a new practice problem to the interactive graphical user interface based on matching at least one of the updated user specific comprehension ratings to a problem difficulty rating of the new practice problem or to within a predetermined range of the problem difficulty rating of the new practice problem.

2. The method of claim 1, further comprising:
    prior to outputting the practice problem, identifying a potential practice problem having a problem difficulty rating within a predetermined range of at least one user specific comprehension rating for a specified user; and
    selecting the identified potential practice problem as the practice problem to output.

3. The method of claim 2, wherein identifying the potential practice problem comprises identifying a problem that the specified user has not previously attempted.

4. The method of claim 2, wherein identifying the potential practice problem comprises identifying a problem associated with at least one concept tag that corresponds to a subject-matter area selected by the specified user.

5. The method of claim 1, wherein each user specific comprehension rating is unbounded, and wherein each user specific comprehension rating is an indicator of the specified user's comprehension of the corresponding subject-matter area relative to the comprehension of the corresponding subject-matter area by one or more other users.

6. The method of claim 1, wherein determining whether the answer includes a correct or incorrect response to the practice problem comprises determining whether the answer includes a correct response on the user's first attempt to solve the problem.

7. The method of claim 1, wherein updating the corresponding user specific comprehension rating and updating the current problem difficulty rating of the practice problem comprise determining whether the user previously attempted to solve more or less than a predetermined number of practice problems, each of which is associated with at least one of the one or more concept tags.

8. The method of claim 1, wherein each practice problem is identified by a plurality of concept tags, and wherein updating the corresponding user specific comprehension rating and updating the current problem difficulty rating of the practice problem comprise determining whether the user previously attempted to solve more or less than a predetermined number of practice problems, each of which is associated with the plurality of concept tags.

9. A non-transitory computer-readable storage medium coupled to one or more processors and having instructions stored thereon which, when executed by the one or more processors, cause the one or more processors to perform operations for adaptive learning, the operations comprising:
    outputting, from the one or more processors executing an interactive learning program of an online learning system, a practice problem having a current problem difficulty rating to an interactive graphical user interface, wherein the practice problem is identified by one or more concept tags, each concept tag relating to a different subject-matter area that forms a basis of the practice problem, wherein the current problem difficulty rating is derived based on whether one or more users previously answered the practice problem correctly or incorrectly;

receiving, by the one or more processors and from the interactive graphical user interface, an answer from a first user to the practice problem;

responsive to receiving the answer, determining whether the answer includes a correct or incorrect response to the practice problem;

responsive to determining whether the answer includes a correct or incorrect response, automatically updating in real-time, for each of the different subject-matter areas that forms a basis of the practice problem, a corresponding user specific comprehension rating for the first user based on the current problem difficulty rating to provide an updated user specific comprehension rating, such that the updated user specific comprehension rating is indirectly based on other user responses to the practice problem and directly based on the first user's response to the practice problem, and automatically updating in real-time, for each of the different subject-matter areas that forms the basis of the practice problem, the current problem difficulty rating of the practice problem to provide an updated problem difficulty rating, such that the updated problem difficulty rating is indirectly based on other user responses to the practice problem and directly based on the first user's response to the practice problem, wherein a magnitude of the changes to the user specific comprehension rating and to the current problem difficulty rating depends on the user specific comprehension rating prior to receiving the answer, the current problem difficulty rating prior to receiving the answer, and whether the answer includes a correct or incorrect response;

outputting, for at least one of the different subject-matter areas that forms the basis of the practice problem, the updated user specific comprehension rating to the interactive graphical user interface; and subsequent to automatically updating the corresponding user specific comprehension rating for each of the different subject-matter areas, automatically outputting a new practice problem to the interactive graphical user interface based on matching at least one of the updated user specific comprehension ratings to a problem difficulty rating of the new practice problem or to within a predetermined range of the problem difficulty rating of the new practice problem.

10. The computer-readable storage medium of claim 9, wherein operations further comprise:

prior to outputting the practice problem, identifying a potential practice problem having a problem difficulty rating within a predetermined range of at least one user specific comprehension rating for a specified user; and selecting the identified potential practice problem as the practice problem to output.

11. The computer-readable storage medium of claim 10, wherein identifying the potential practice problem comprises identifying a problem that the specified user has not previously attempted.

12. The computer-readable storage medium of claim 10, wherein identifying the potential practice problem comprises identifying a problem associated with at least one concept tag that corresponds to a subject-matter area selected by the specified user.

13. The computer-readable storage medium of claim 10, wherein each user specific comprehension rating is unbounded, and wherein each user specific comprehension rating is indicative of the specified user's comprehension of the corresponding concept relative to a plurality of other users.

14. The computer-readable storage medium of claim 9, wherein determining whether the answer includes a correct or incorrect response to the practice problem comprises determining whether the answer includes a correct response on the user's first attempt to solve the problem.

15. The computer-readable storage medium of claim 9, wherein updating the corresponding user specific comprehension rating and updating the current problem difficulty rating of the practice problem comprise determining whether the user previously attempted to solve more or less than a predetermined number of practice problems, each of which is associated with at least one of the one or more concept tags.

16. The computer-readable storage medium of claim 9, wherein each practice problem is identified by a plurality of concept tags, and wherein updating the corresponding user specific comprehension rating and updating the current problem difficulty rating of the practice problem comprise determining whether the user previously attempted to solve more or less than a predetermined number of practice problems, each of which is associated with the plurality of concept tags.

17. A system, comprising:

a computing device; and a computer-readable storage device coupled to the computing device and having instructions stored thereon which, when executed by one or more processors of the computing device, cause the computing device to perform operations for adaptive learning, the operations comprising:

executing an interactive learning program of an online learning system;

outputting, to the interactive learning program, a practice problem having a current problem difficulty rating to an interactive graphical user interface, wherein the practice problem is identified by one or more concept tags, each concept tag relating to a different subject-matter area that forms a basis of the practice problem, wherein the current problem difficulty rating is derived based on whether one or more users previously answered the practice problem correctly or incorrectly;

receiving from the interactive graphical user interface an answer from a first user to the practice problem;

responsive to receiving the answer, determining whether the answer includes a correct or incorrect response to the practice problem;

responsive to determining whether the answer includes a correct or incorrect response, automatically updating in real-time, for each of the different subject-matter areas that forms a basis of the practice problem, a corresponding user specific comprehension rating for the first user based on the current problem difficulty rating to provide an updated user specific comprehension rating, such that the updated user specific comprehension rating is indirectly based on other user responses to the practice problem and directly based on the first user's response to the practice problem, and automatically updating in real-time, for each of the different subject-matter areas that forms the basis of the practice problem, the current problem difficulty rating of the practice problem to provide an updated problem difficulty rating, such that the updated problem difficulty rating is indirectly based on other user responses to the practice problem and directly based on the first user's response to the practice problem, wherein a magnitude of the changes to the user specific comprehension rating and to the current problem difficulty rating depends on the user specific comprehension rating prior to receiving the answer, the problem difficulty rating prior to receiving the answer, and whether the answer includes a correct or incorrect response;

outputting, for at least one of the different subject-matter areas that forms the basis of the practice problem, the updated user specific comprehension rating to the interactive graphical user interface; and subsequent to automatically updating the corresponding user specific comprehension rating for each of the different subject-matter areas, automatically outputting a new practice problem to the interactive graphical user interface based on matching at least one of the updated user specific comprehension ratings to a problem difficulty rating of the new practice problem or to within a predetermined range of the problem difficulty rating of the new practice problem.

18. The system of claim 17, wherein operations further comprise:

prior to outputting the practice problem, identifying a potential practice problem having a problem difficulty rating within a predetermined range of at least one user specific comprehension rating for a specified user; and selecting the identified potential practice problem as the practice problem to output.

19. The system of claim 18, wherein identifying the potential practice problem comprises identifying a problem that the specified user has not previously attempted.

20. The system of claim 18, wherein identifying the potential practice problem comprises identifying a problem associated with at least one concept tag that corresponds to a subject-matter area selected by the specified user.

21. The system of claim 17, wherein each user specific comprehension rating is unbounded, and wherein each user specific comprehension rating is indicative of the specified user's comprehension of the corresponding concept relative to a plurality of other users.

22. The system of claim 17, wherein determining whether the answer includes a correct or incorrect response to the practice problem comprises determining whether the answer includes a correct response on the user's first attempt to solve the problem.

23. The system of claim 17, wherein updating the corresponding user specific comprehension rating and updating the current problem difficulty rating of the practice problem comprise determining whether the user previously attempted to solve more or less than a predetermined number of practice problems, each of which is associated with at least one of the one or more concept tags.

24. The system of claim 17, wherein each practice problem is identified by a plurality of concept tags, and wherein updating the corresponding user specific comprehension rating and updating the current problem difficulty rating of the practice problem comprise determining whether the user previously attempted to solve more or less than a predetermined number of practice problems, each of which is associated with the plurality of concept tags.

25. A computer-implemented method for adaptive learning, the method being executed using one or more processors and comprising:

receiving, over a network, from a client device, an identification by a first user of at least one subject-matter area to review;

responsive to receiving the identification, identifying, by the one or more processors, a potential practice problem having a current problem difficulty rating within a predetermined range of at least one user specific comprehension rating for the first user, wherein the practice problem is identified by one or more concept tags, each concept tag relating to a different subject-matter area that forms a basis of the practice problem, wherein the current problem difficulty rating is derived based on whether one or more users previously answered the practice problem correctly or incorrectly;

transmitting, from the one or more processors, the identified practice problem to the client device over the network;

receiving, over the network, from the client device, an answer to the practice problem;

responsive to receiving the answer, determining, by the one or more processors, whether the answer includes a correct or incorrect response to the practice problem;

responsive to determining whether the answer includes a correct or incorrect response, automatically updating, for each of the different subject-matter areas that forms a basis of the practice problem, a corresponding user specific comprehension rating to provide an updated user specific comprehension rating that is indirectly based on other user responses to the practice problem and directly based on the first user's response to the practice problem, and automatically updating the current problem difficulty rating of the practice problem to provide an updated problem difficulty rating, such that the updated problem difficulty rating is indirectly based on other user responses to the practice problem and directly based on the first user's response to the practice problem, wherein a magnitude of the changes to the user specific comprehension rating and the current problem difficulty rating depends on the user specific comprehension rating prior to receiving the answer, the current problem difficulty rating prior to receiving the answer, and whether the answer includes a correct or incorrect response;

outputting, for at least one of the different subject-matter areas that forms the basis of the practice problem, the updated user specific comprehension rating to an interactive graphical user interface; and subsequent to automatically updating the corresponding user specific comprehension rating for each of the different subject-matter areas, automatically outputting a new practice problem to the interactive graphical user interface based on matching at least one of the updated user specific comprehension ratings to a problem difficulty rating of the new practice problem or to within a predetermined range of the problem difficulty rating of the new practice problem.

26. A non-transitory computer-readable storage medium coupled to one or more processors and having instructions stored thereon which, when executed by the one or more processors, cause the one or more processors to perform operations for adaptive learning, the operations comprising:

receiving, over a network, from a client device, an identification by a first user of at least one subject-matter area to review;

responsive to receiving the identification, identifying, by the one or more processors, a potential practice problem having a current problem difficulty rating within a predetermined range of at least one user specific comprehension rating for the first user, wherein the practice problem is identified by one or more concept tags, each concept tag relating to a different subject-matter area that forms a basis of the practice problem, wherein the current problem difficulty rating is derived based on whether one or more users previously answered the practice problem correctly or incorrectly;

transmitting, from the one or more processors, the identified practice problem to the client device over the network;

receiving, over the network, from the client device, an answer to the practice problem;

responsive to receiving the answer, determining, by the one or more processors, whether the answer includes a correct or incorrect response to the practice problem;

responsive to determining whether the answer includes a correct or incorrect response, automatically updating, for each of the different subject-matter areas that forms a basis of the practice problem, a corresponding user specific comprehension rating to provide an updated user specific comprehension rating that is indirectly based on other user responses to the practice problem and directly based on the first user's response to the practice problem, and automatically updating the current problem difficulty rating of the practice problem to provide an updated problem difficulty rating, such that the updated problem difficulty rating is indirectly based on other user responses to the practice problem and directly based on the first user's response to the practice problem, wherein a magnitude of the changes to the user specific comprehension rating and the current problem difficulty rating depends on the user specific comprehension rating prior to receiving the answer, the current problem difficulty rating prior to receiving the answer, and whether the answer includes a correct or incorrect response;

outputting, for at least one of the different subject-matter areas that forms the basis of the practice problem, the updated user specific comprehension rating to an interactive graphical user interface; and subsequent to automatically updating the corresponding user specific comprehension rating for each of the different subject-matter areas, automatically outputting a new practice problem to the interactive graphical user interface based on matching at least one of the updated user specific comprehension ratings to a problem difficulty rating of the new practice problem or to within a predetermined range of the problem difficulty rating of the new practice problem.

27. A system, comprising:
a computing device; and
a computer-readable storage device coupled to the computing device and having instructions stored thereon which, when executed by one or more processors of the computing device, cause the computing device to perform operations for adaptive learning, the operations comprising:

receiving, over a network, from a client device, an identification by a first user of at least one subject-matter area to review;

responsive to receiving the identification, identifying a potential practice problem having a current problem difficulty rating within a predetermined range of at least one user specific comprehension rating for the first user, wherein the practice problem is identified by one or more concept tags, each concept tag relating to a different subject-matter area that forms a basis of the practice problem, wherein the current problem difficulty rating is derived based on whether one or more users previously answered the practice problem correctly or incorrectly;

transmitting, from the computing device, the identified practice problem to the client device over the network;

receiving, over the network, from the client device, an answer to the practice problem;

responsive to receiving the answer, determining whether the answer includes a correct or incorrect response to the practice problem;

responsive to determining whether the answer includes a correct or incorrect response, automatically updating, for each of the different subject-matter areas that forms a basis of the practice problem, a corresponding user specific comprehension rating to provide an updated user specific comprehension rating that is indirectly based on other user responses to the practice problem and directly based on the first user's response to the practice problem, and automatically updating the current problem difficulty rating of the practice problem to provide an updated problem difficulty rating, such that the updated problem difficulty rating is indirectly based on other user responses to the practice problem and directly based on the first user's response to the practice problem, wherein a magnitude of the changes to the user specific comprehension rating and the current problem difficulty rating depends on the user specific comprehension rating prior to receiving the answer, the problem difficulty rating prior to receiving the answer, and whether the answer includes a correct or incorrect response;

outputting, for at least one of the different subject-matter areas that forms the basis of the practice problem, the updated user specific comprehension rating to an interactive graphical user interface; and subsequent to automatically updating the corresponding user specific comprehension rating for each of the different subject-matter areas, automatically outputting a new practice problem to the interactive graphical user interface based on matching at least one of the updated user specific comprehension ratings to a problem difficulty rating of the new practice problem or to within a predetermined range of the problem difficulty rating of the new practice problem.

28. The method of claim 1, wherein updating the current problem difficulty rating comprises:
deriving an expected result value for each concept tag to provide a set of expected results; and
modifying the current problem difficulty rating based, in part, on all of the set of expected results to provide the updated problem difficulty rating.

29. The method of claim 1, wherein updating the user specific comprehension rating for each of the different subject-matter areas comprises:
deriving an expected result value for each concept tag to provide a set of expected results; and
for each of the different subject-matter areas, modifying the corresponding user specific comprehension rating based, in part, on the set of expected results.

30. The method of claim 1, wherein updating, for each of the different subject-matter areas that forms the basis of the practice problem, the corresponding user specific comprehension rating and the current problem difficulty rating of the practice problem is performed in real-time.

* * * * *